(12) United States Patent
Takaoka et al.

(10) Patent No.: US 8,113,133 B2
(45) Date of Patent: Feb. 14, 2012

(54) DISSIMILAR JOINT STRUCTURE, TANK SKIRT INCLUDING DISSIMILAR JOINT STRUCTURE, TRANSPORT SHIP INCLUDING TANK SKIRT, AND METHOD FOR JOINING DISSIMILAR METAL MEMBERS

(75) Inventors: Yukichi Takaoka, Kobe (JP); Noriko Omichi, Himeji (JP); Mitsuo Fujimoto, Kobe (JP); Hidehito Nishida, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 12/810,504

(22) PCT Filed: Sep. 17, 2008

(86) PCT No.: PCT/JP2008/002556
§ 371 (c)(1),
(2), (4) Date: Jul. 9, 2010

(87) PCT Pub. No.: WO2009/084136
PCT Pub. Date: Jul. 9, 2009

(65) Prior Publication Data
US 2010/0275834 A1    Nov. 4, 2010

(30) Foreign Application Priority Data
Dec. 27, 2007  (JP) ................................ 2007-336311

(51) Int. Cl.
*B63B 25/08*   (2006.01)
(52) U.S. Cl. ...................................................... 114/74 A
(58) Field of Classification Search .................. 114/74 A
See application file for complete search history.

(56) References Cited

U.S. PATENT DOCUMENTS

| 2005/0103824 A1* | 5/2005 | Waldron et al. ............ 228/112.1 |
| 2006/0102699 A1* | 5/2006 | Burton et al. ............... 228/112.1 |
| 2006/0275623 A1* | 12/2006 | Takeda et al. .................. 428/653 |

FOREIGN PATENT DOCUMENTS

| JP | 11-342481 | 12/1999 |
| JP | 2001-259865 | 9/2001 |
| JP | 2004-074870 | 3/2004 |
| JP | 2005-007466 | 1/2005 |
| JP | 2007-153064 | 6/2007 |
| JP | 2007-222925 | 9/2007 |

OTHER PUBLICATIONS

ISA Japan, International Search Report of PCT/JP2008/002556, Dec. 22, 2008, 3 pages.

* cited by examiner

*Primary Examiner* — Stephen Avila
(74) *Attorney, Agent, or Firm* — Alleman Hall McCoy Russell & Tuttle LLP

(57) ABSTRACT

A dissimilar joint structure according to the present invention is provided at a first metal member and a second metal member which are made of dissimilar metals to each other. The dissimilar joint structure couples the first metal member and the second metal member 7. An inserting groove 8a is formed at the first metal member. The second metal member includes an inserting portion which is able to be inserted into the inserting groove. The first metal member is joined to the inserting portion 9 with the inserting portion 9 inserted into the inserting groove 8a.

15 Claims, 19 Drawing Sheets

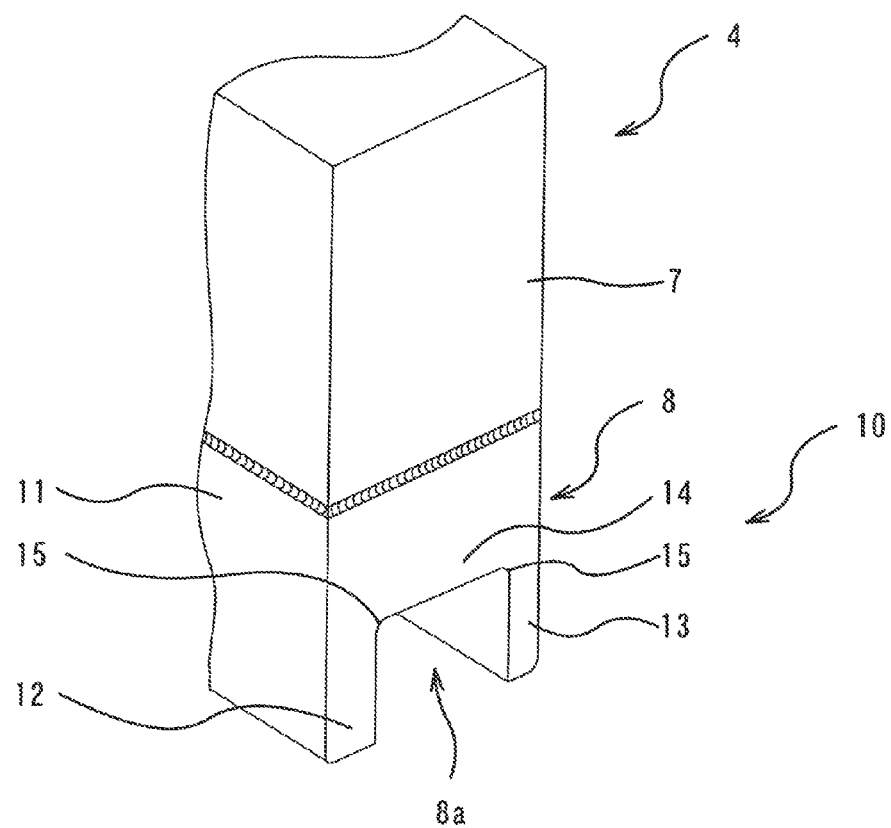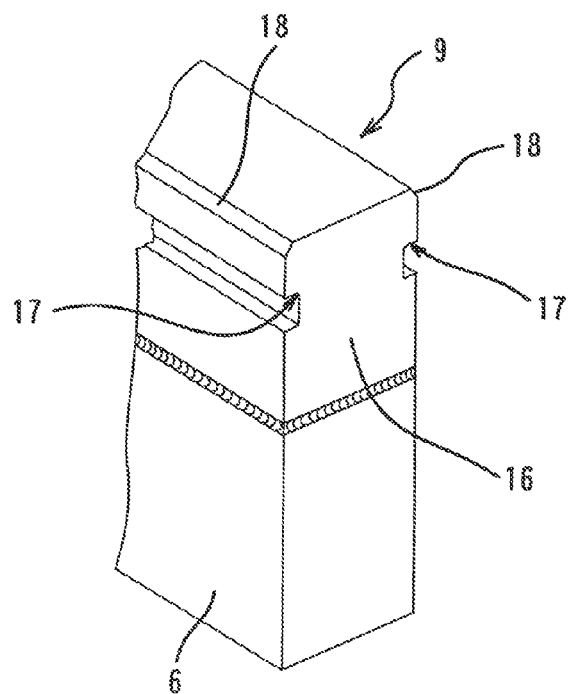
Fig. 4

DISSIMILAR JOINT STRUCTURE, TANK SKIRT INCLUDING DISSIMILAR JOINT STRUCTURE, TRANSPORT SHIP INCLUDING TANK SKIRT, AND METHOD FOR JOINING DISSIMILAR METAL MEMBERS

TECHNICAL FIELD

The present invention relates to a dissimilar joint structure configured to join two metal members made of dissimilar metals to each other, especially dissimilar metals which are difficult to be welded to each other, and a method for joining such two metal members. The present invention also relates to a tank skirt including the dissimilar joint structure and a transport ship including the tank skirt.

BACKGROUND ART

Liquid cargo transport ships include a MOSS type LNG transport ship which stores a LNG (liquefied natural gas) in a spherical tank and transports the LNG. In such a transport ship, the temperature of the cargo stored in the tank is extremely low (about −163 degrees centigrade). In order to prevent the temperature of a hull itself from significantly decreasing by this cargo, the tank is supported by the hull via a tank skirt.

Typically, the hull is made of iron-based steel in order to secure its strength, and the tank is made of an aluminum alloy in order to resist low temperature. The tank skirt is interposed between these dissimilar metal materials and includes a tank supporting member made of the same material as the tank and fixed to the tank and a hull supporting member made of the same material as the hull and fixed to the hull. These supporting members are joined to each other by a dissimilar joint structure.

Patent Document 1 discloses the dissimilar joint structure including a first plate-shaped member joined to an end portion of the tank supporting member and a second plate-shaped member joined to an end portion of the hull supporting member. In accordance with this dissimilar joint structure, an end surface of the first plate-shaped member and an end surface of the second plate-shaped member are caused to face each other, and these facing portions are joined to each other by friction stir welding. As compared to a case where explosive cladding is utilized, by utilizing the friction stir welding, the dissimilar joint structure can be increased in length, and a projection length of the dissimilar joint structure with respect to both supporting members can be decreased.
Patent Document 1: Japanese Laid-Open Patent Application Publication No. 2007-153064

DISCLOSURE OF THE INVENTION

Problems to be Solved by the Invention

In accordance with the dissimilar joint structure of Patent Document 1, the end surfaces of two plate-shaped members are joined to each other with these end surfaces facing each other. Therefore, in a case where a periphery of the dissimilar joint structure is repeatedly bent, the end surfaces are easily detached, and fatigue strength is inadequate.

An object of the present invention is to provide a dissimilar joint structure having high fatigue strength.

Means for Solving the Problems

A dissimilar joint structure according to the present invention is configured to join a first metal member and a second metal member which are made of dissimilar metals to each other, wherein: an inserting groove is formed at the first metal member, and an inserting portion is formed at the second metal member so as to be able to be inserted into the inserting groove; and the first metal member is joined to the second metal member with the inserting portion inserted into the inserting groove.

Moreover, a method for joining dissimilar metal members according to one aspect of the present invention is a method for joining a first metal member and a second metal member which are made of dissimilar metals to each other, comprising the steps of: inserting an inserting portion of the second metal member into an inserting groove of the first metal member; and joining the first metal member to the second metal member by pressing a rotary tool of a friction stir welding apparatus against an outer surface of the first metal member, causing the rotary tool to move from the outer surface toward the inserting portion, and causing the rotary tool to move in a direction in which the first metal member extends.

In accordance with this configuration, since the inserting portion is inserted into the inserting groove, the first metal member and the second metal member overlap each other. Therefore, even in a case where the periphery of the dissimilar joint structure repeatedly bends, the connecting portions are unlikely to be detached from each other. On this account, the fatigue strength of the dissimilar joint structure becomes higher than before.

Moreover, the method for joining the dissimilar metal members according to another aspect of the present invention is a method for joining a first metal member and a second metal member which are made of dissimilar metals to each other, comprising the steps of: covering one side surface of an inserting portion of the second metal member with a first groove forming member; joining the first groove forming member to the inserting portion by pressing a rotary tool of a friction stir welding apparatus against an outer surface of the first groove forming member, causing the rotary tool to move from the outer surface toward the inserting portion, and causing the rotary tool to move in a direction in which the first groove forming member extends; covering the other side surface of the inserting portion with a second groove forming member; joining the first groove forming member to the inserting portion by pressing the rotary tool of the friction stir welding apparatus against an outer surface of the second groove forming member, causing the rotary tool to move from the outer surface toward the inserting portion, and causing the rotary tool to move in a direction in which the second groove forming member extends; and joining an end surface of the first metal member to an end surface of the first groove forming member and an end surface of the second groove forming member with the end surface of the first metal member contacting an end surface of the inserting portion.

Moreover, a tank skirt according to the present invention includes such a dissimilar joint structure. Therefore, the quality of the tank skirt improves. A transport ship according to the present invention includes such a tank skirt.

The above object, other objects, features and advantages of the present invention will be made clear by the following detailed explanation of preferred embodiments with reference to the attached drawings.

Advantageous Effects of the Invention

The present invention can provide a dissimilar joint structure having higher fatigue strength than before.

BRIEF DESCRIPTION OF THE DRAWINGS

FIG. 4 is an exploded perspective view of the dissimilar joint structure according to Embodiment 1.

EXPLANATION OF REFERENCE NUMBERS

Figure 1:
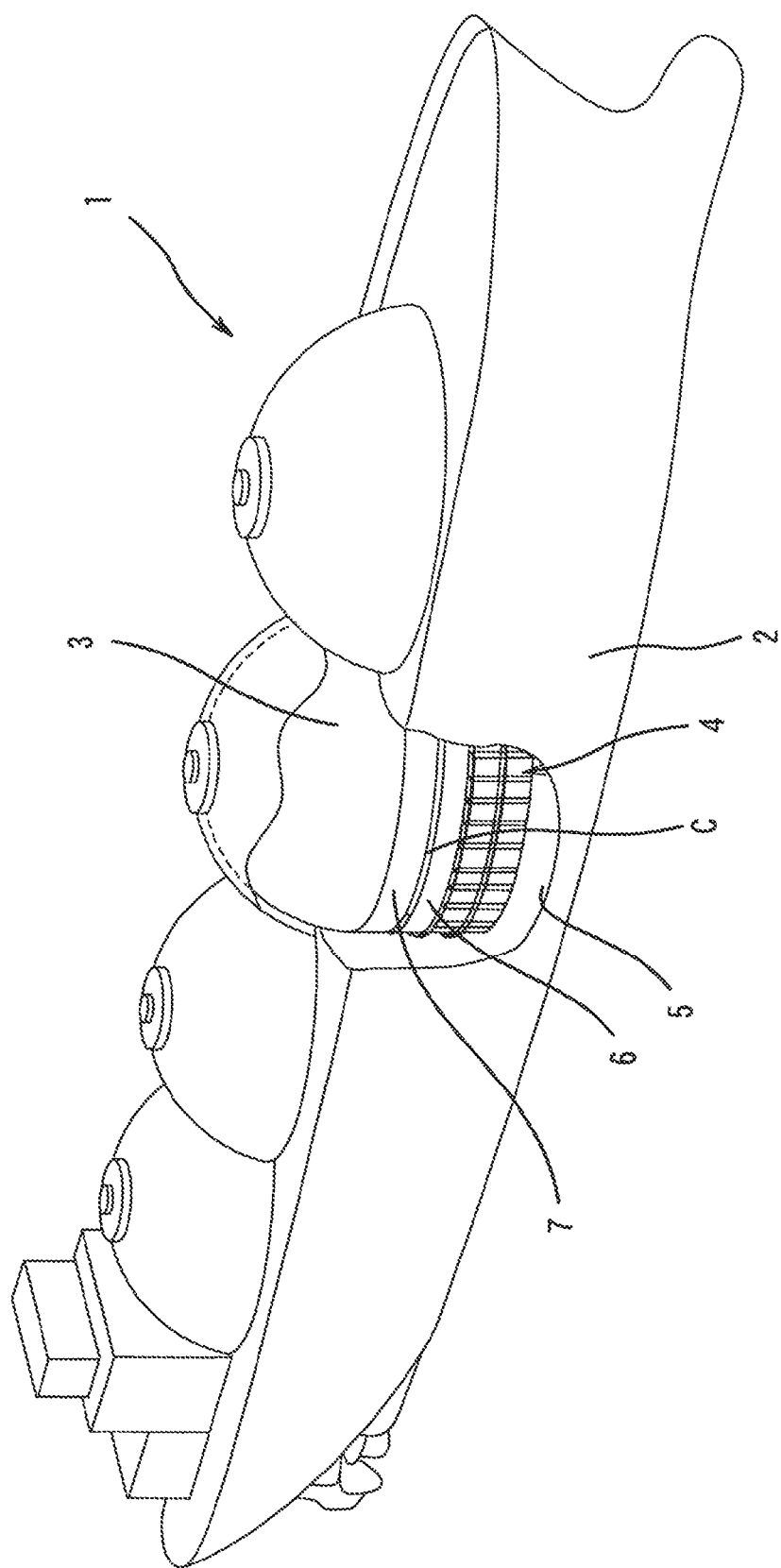
FIG. 1 is a perspective view showing an appearance of an LNG transport ship according to embodiments of the present invention.

C dissimilar joint structure
1 LNG transport ship
2 hull
3 tank
4 tank skirt
6 hull supporting member (second metal member)
7 tank supporting member (first metal member)
8 groove forming portion
8a inserting groove
9 inserting portion
10, 10A dissimilar joint structure (Embodiment 1)
40, 40A, 40B, 40C, 40D dissimilar joint structure (Embodiment 2)
50, 50A, 50B, 50C dissimilar joint structure (Embodiment 3)
60 dissimilar joint structure (Embodiment 4)
70 dissimilar joint structure (Embodiment 5)
80 dissimilar joint structure (Embodiment 6)

BEST MODE FOR CARRYING OUT THE INVENTION

Hereinafter, embodiments of the present invention will be explained in reference to the attached drawings.

FIG. 1 is a perspective view showing an appearance of an LNG transport ship 1 according to the embodiments of the present invention. The LNG transport ship 1 shown in FIG. 1 includes four spherical tanks 3 made of an aluminum alloy, and a liquefied natural gas having a very low temperature may be stored in each of the tanks 3. As shown by a portion where a part of a hull 2 is cut out, each tank 3 is supported by the hull 2 via a tank skirt 4 (hereinafter simply referred to as a "skirt") formed to have a ring shape.

Figure 2:
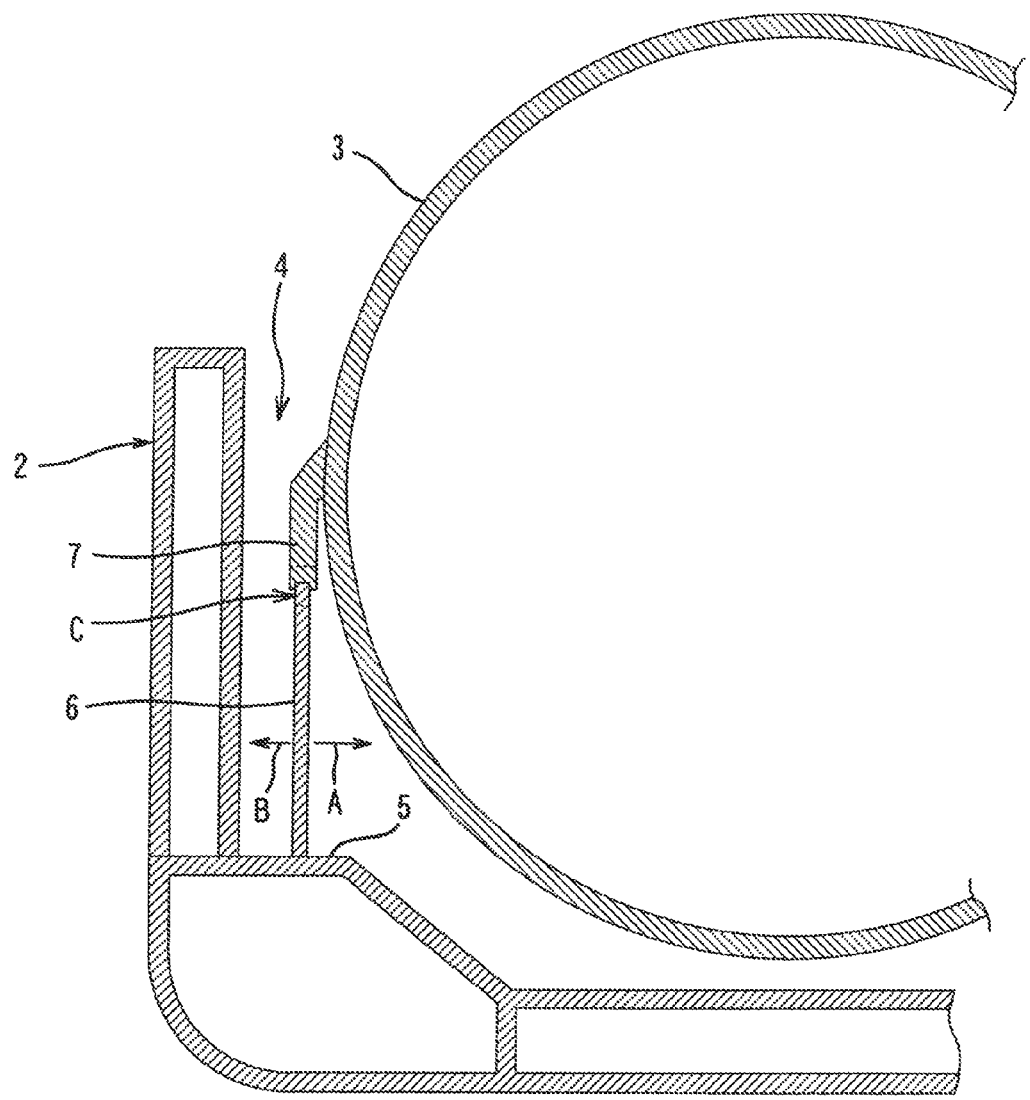
FIG. 2 is a horizontal cross-sectional view showing a partial internal structure of the LNG transport ship according to the embodiments of the present invention.

FIG. 2 is a cross-sectional view showing a partial internal structure of the LNG transport ship 1 according to the embodiments of the present invention. As shown in FIGS. 1 and 2, the skirt 4 extends from a base 5 of the hull 2 in a vertical direction. A lower end of the skirt 4 is welded to the base 5, and an upper end thereof is welded to an outer peripheral surface of the tank 3. The skirt 4 includes a cylindrical hull supporting member 6 fixed to the base 5 and extending in the vertical direction and a cylindrical tank supporting member 7 fixed to the tank 3 and extending in the vertical direction. Each of the hull supporting member 6 and the tank supporting member 7 is formed in a cylindrical shape as a whole such that a plurality of curved parts (10 to 20, for example) each having the same curvature are connected to one another in a circumferential direction. In the following explanation of the skirt 4, an A side in FIG. 2 which is a side where the tank 3 is provided is referred to as an inner side, and a B side in FIG. 2 which is a side opposite to the A side is referred to as an outer side.

A part of the hull supporting member 6 is made of steel, such as stainless steel or high manganese steel, and the tank supporting member 7 is made of an aluminum alloy. The tank supporting member 7 made of the aluminum alloy is larger in thickness than the hull supporting member 6 made of steel.

Since the melting point of the hull supporting member 6 and the melting point of the tank supporting member 7 are different from each other, it is difficult to directly join the members 6 and 7 by welding. Therefore, a dissimilar joint structure C configured to join the members 6 and 7 each other is provided at an upper end portion of the hull supporting member 6 and a lower end portion of the tank supporting member 7.

Figure 3:
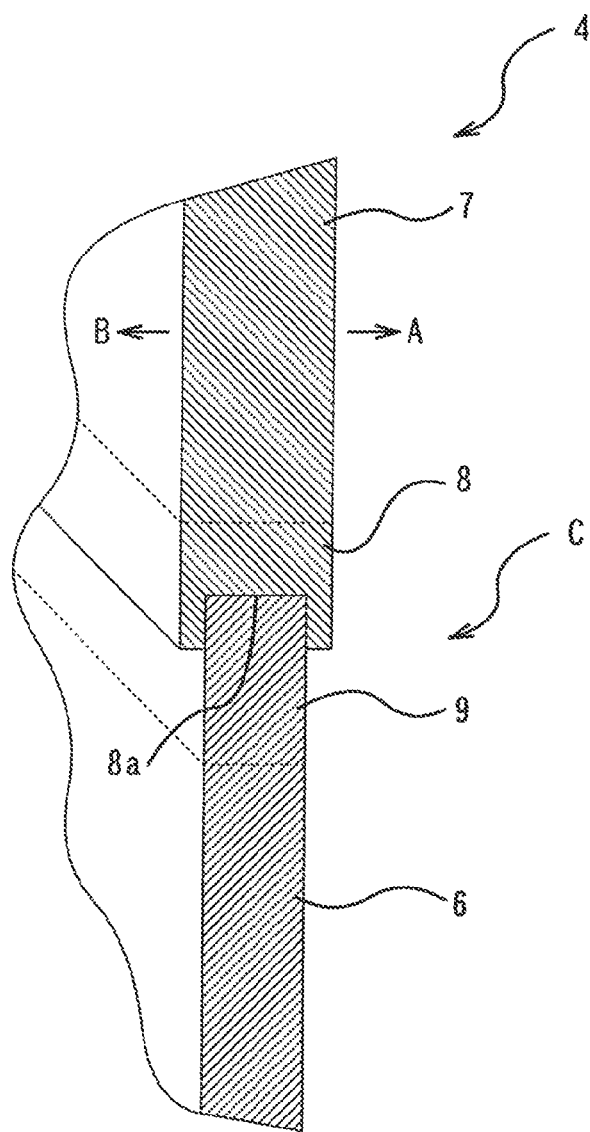
FIG. 3 is a cross-sectional view schematically showing important portions of a tank skirt according to the embodiments of the present invention.

FIG. 3 is a cross-sectional view schematically showing a part of the skirt 4. As shown in FIG. 3, the dissimilar joint structure C includes a groove forming portion 8 and an inserting portion 9. The groove forming portion 8 is formed at the lower end portion of the tank supporting member 7 and has an inserting groove 8a. The inserting portion 9 is formed at the upper end portion of the hull supporting member 6 and can be inserted into the inserting groove 8a. In FIG. 3, the tank supporting member 7 and the groove forming portion 8 are defined by a dotted line. This is because as described below, the groove forming portion 8 may be formed integrally with or separately from the tank supporting member 7. In addition, this is because a first metal member of the present invention may include the tank supporting member 7 and the groove forming portion 8. Similarly, in FIG. 3, the hull supporting member 6 and the inserting portion 9 are defined by a dotted line. This is because, as described below, the inserting portion 9 may be formed integrally with or separately from the hull supporting member 6. In addition, this is because a second metal member of the present invention may include the hull supporting member 6 and the inserting portion 9.

The above-described configuration is common among the embodiments explained below.

Embodiment 1

FIG. 4 is an exploded perspective view of a dissimilar joint structure 10 according to Embodiment 1 of the present invention. The dissimilar joint structure 10 includes the groove forming portion 8 formed separately from the tank supporting member 7 and the inserting portion 9 formed separately from the hull supporting member 6.

The groove forming portion 8 is constituted by a groove forming member 11. Although the groove forming member 11 is formed separately from the tank supporting member 7, it is made of a metal material, such as an Al—Mn alloy, that is the same as a metal material of the tank supporting member 7. The groove forming member 11 is formed to have a U-shaped cross section and includes a pair of side wall portions 12 and 13 and a base portion 14 connecting the pair of side wall portions 12 and 13. The groove forming member 11 is provided such that the pair of side wall portions 12 and 13 extends downward from the base portion 14. An upper end surface of the base portion 14 is caused to face a lower end surface of the tank supporting member 7, and connecting portions of the members 7 and 11 are welded to each other by butt welding with these end surfaces facing each other. Since the members 7 and 11 are made of the same metal material, this welding can be carried out easily. With this, an inserting groove 8a extending in a longitudinal direction, that is, in a circumferential direction of the tank supporting member 7 is formed at a lower end portion of the groove forming member 11 and between the pair of side wall portions 12 and 13. Surfaces of the inserting groove 8a are inner surfaces of the side wall portions 12 and 13 and an inner surface of the base wall 14.

Each of a corner portion 15 formed between the side wall portion 12 and the base wall 14 and a corner portion 15 formed between the side wall portion 13 and the base wall 14 is formed to have a round shape by machine work. With this, it is possible to prevent the corner portion 15 from cracking by stress concentration. The surface of the inserting groove 8a is treated such that surface roughness thereof becomes equal to or lower than a comparatively small predetermined value (6.3 μm). The side wall portion 12 located on an outer side of the inserting groove 8a is thicker than the side wall portion 13 located on an inner side of the inserting groove 8a. Details regarding this thickness difference and actions regarding this will be explained later in reference to FIG. 6.

The inserting portion 9 is constituted by an inserting member 16. Although the inserting member 16 is formed separately from the hull supporting member 6, it is made of a metal material, such as stainless steel, that is the same as a metal material of the hull supporting member 6 by hot rolling. A lower end surface of the inserting member 16 is caused to face an upper end surface of the hull supporting member 6, and connecting portions of the members 6 and 16 are welded to each other by butt welding with the surfaces facing each other. Since the members 6 and 16 are made of the same metal material, this welding can be carried out easily.

A concave groove 17 extending in the longitudinal direction, that is, the circumferential direction of the hull supporting member 6 is formed on each of both side surfaces of the inserting member 16. As shown, the concave groove 17 has a U-shaped cross section. However, the cross-sectional shape of the concave groove may be the other shape, such as a semicircular shape. Moreover, as shown, only one concave groove 17 is formed on each side surface. However, a plurality of concave grooves may be formed on each of both surfaces.

Moreover, a pair of corner portions each formed between an upper end surface of the inserting member 16 and each side surface of the inserting member 16 are chamfered by machine work. With this, a pair of chamfered portions 18 extending in the longitudinal direction are formed at an upper end portion of the inserting member 16.

In the case of forming the inserting member 16 by hot rolling, an oxide film may be formed on the surface of the inserting member 16. In order to remove the oxide film, the surface of the inserting portion 9 is surface-treated by buffing or machine work. Further, the surface of the inserting portion 9 is treated such that the surface roughness thereof becomes equal to or lower than a comparatively small predetermined value (3 μm).

A method for joining the hull supporting member 6 and the tank supporting member 7 by utilizing the dissimilar joint structure 10 will be explained based on FIG. 5. First, the inserting portion 9 of the inserting member 16 is inserted into the inserting groove 8a of the groove forming member 11.

At this time, since the chamfered portions 18 are formed at an upper end portion of the inserting portion 9, the inserting portion 9 is easily inserted into the inserting groove 8a. The chamfered portion 18 may have any shape as long as the inserting portion 9 is easily inserted as above. Therefore, instead of the chamfering of 45 degrees as shown, the chamfered portion 18 may be formed to have a round shape.

Moreover, since the oxide film is removed from the surface of the inserting portion 9, and an active new surface appears, joint strength between the surface of the inserting groove 8a and the surface of the inserting portion 9 improves. Further, since the surface roughness of the surface of the inserting groove 8a and the surface roughness of the surface of the inserting portion 9 are small, the joint strength between the surface of the inserting groove 8a and the surface of the inserting portion 9 further improves, and the inserting portion 9 is easily inserted into the inserting groove 8a.

Next, the groove forming portion 8 (that is, the groove forming member 11 constituting a part of the first metal member) is joined to the inserting portion 9 (that is, the inserting member 16 constituting a part of the second metal member). The following will explain an example in which friction stir welding is utilized.

The friction stir welding is a method for: pressing a rotary tool of a friction stir welding apparatus against one of two joining members, the rotary tool being made of a harder material than the two joining members; fluidizing one of two joining members by a frictional heat generated by causing the rotary tool to rotate and move; and joining the fluidized joining member to the other joining member. In accordance with this method, solid-phase portions can be joined to each other while being integrated. Therefore, even in the case of joining elongated members, the members can be continuously joined to each other in the longitudinal direction without causing thermal distortion. Further, since this method is a solid-phase welding utilizing fluidization of the metal material by the frictional heat generated between the rotary tool and the joining member, the joining members can be joined to each other without melting the joining members, and the joining members are unlikely to deform before and after the joining.

Figure 5:
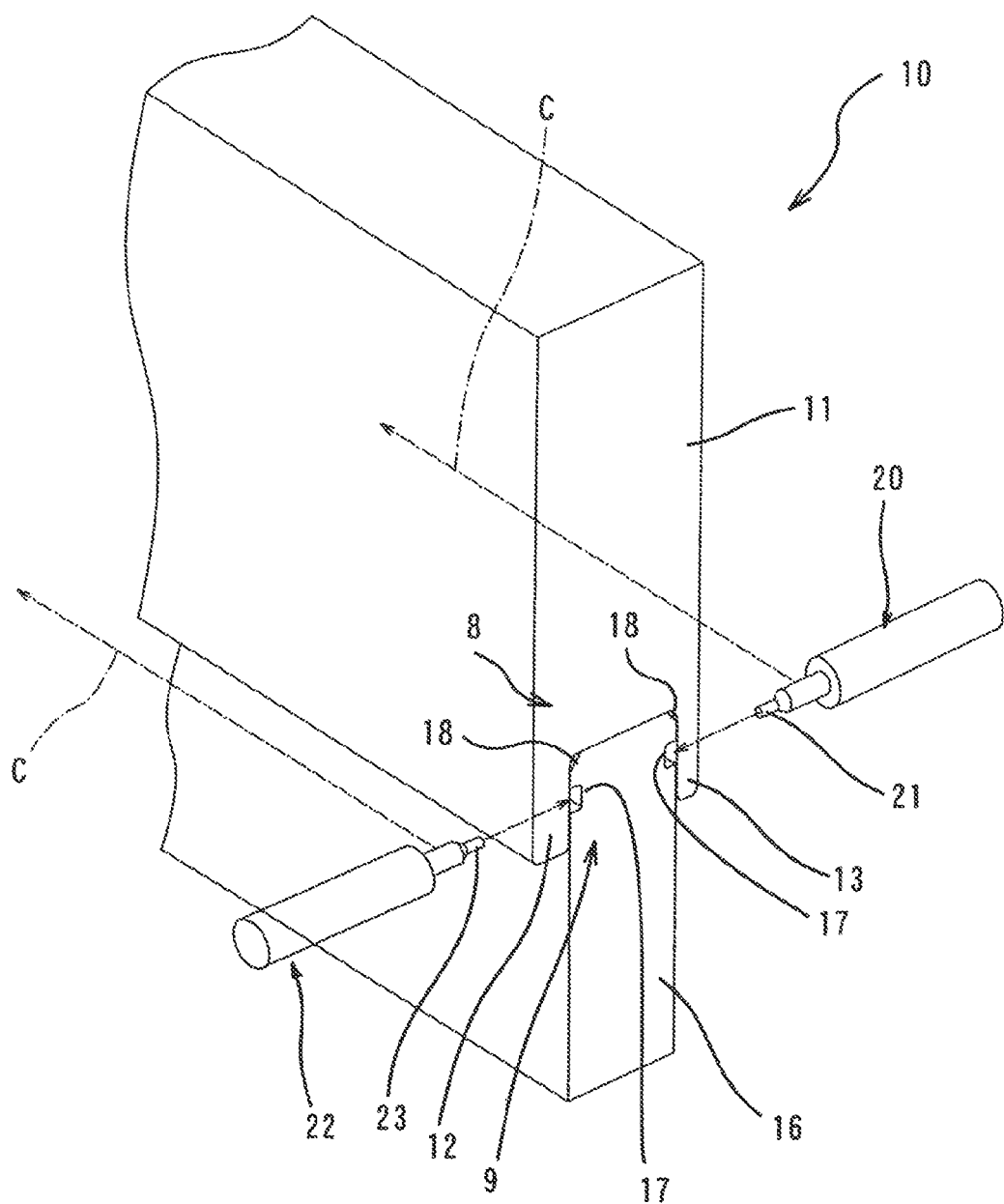
FIG. 5 is an explanatory diagram of a method for manufacturing the dissimilar joint structure according to Embodiment 1.

Specifically, as shown in FIG. 5, a rotary tool 21 of a friction stir welding apparatus 20 is caused to contact an outer surface of the inner side wall portion 13. At this time, a position with which the rotary tool 21 contacts is a position which is located on the side surface of the groove forming member and corresponds to the concave groove 17 of the inserting portion 9. To be specific, in the case of forming a plurality of concave grooves 17 on each side surface, the rotary tool 21 is caused to move in accordance with the number of concave grooves 17. By causing the rotary tool 21 to move in a thickness direction from the outer surface toward the concave groove 17, the frictional heat is generated on the side wall portion 13, and a portion of the side wall portion 13 which portion is located around the rotary tool 21 is fluidized by this heat.

By causing the rotary tool 21 to move in the longitudinal direction in this state, the side wall portion 13 is stirred while receiving pressure, and the metal material constituting the side wall portion 13 thoroughly gets into the concave groove 17. At this time, the surface of the concave groove 17 and a tip end portion of the rotary tool 21 friction each other, so that the surface of the concave groove 17 becomes an active new surface. Since the active metal material of the side wall portion 13 stirred by plastic flow is welded to the new surface by pressure welding, the inner side wall portion 13 of the groove forming portion 8 can be strongly joined to the inserting portion 8.

Similarly, a rotary tool 23 of a friction stir welding apparatus 22 is caused to contact an outer surface of the outer side wall portion 12. Then, the rotary tool 23 is caused to move in the thickness direction from the outer surface toward the concave groove 17 and is caused to move in the longitudinal direction. With this, the frictional heat is generated on the side wall portion 12, a portion of the side wall portion 12 which portion is located around the rotary tool 23 fluidizes, the side wall portion 12 is stirred while receiving pressure, and the metal material constituting the side wall portion 12 thoroughly gets into the concave groove 17. At this time, as with the above, the surface of the concave groove 17 becomes an active new surface, and the active metal material constituting the side wall portion 12 is welded to the concave groove 17 by pressure welding. Therefore, the outer side wall portion 12 of the groove forming portion 8 can be strongly joined to the inserting portion 8.

In FIG. 5, the rotary tools press the groove forming portion 8 from both sides. However, actually, the groove forming member 11 and the inserting member 16 are laid on a worktable, not shown, in a factory with the inserting portion 9 inserted into the inserting groove 8a. Then, the rotary tool is pressed from above against the outer surface of the side wall portion 13 facing upward, and a joining work is carried out. Next, the groove forming member 11 and the inserting member 16 are turned over. Then, the rotary tool is pressed from above against the outer surface of the side wall portion 12 facing upward, and the joining work is carried out. Herein, the inner side wall portion 13 is processed at first. However, the outer side wall portion 12 may be processed at first.

Figure 6:
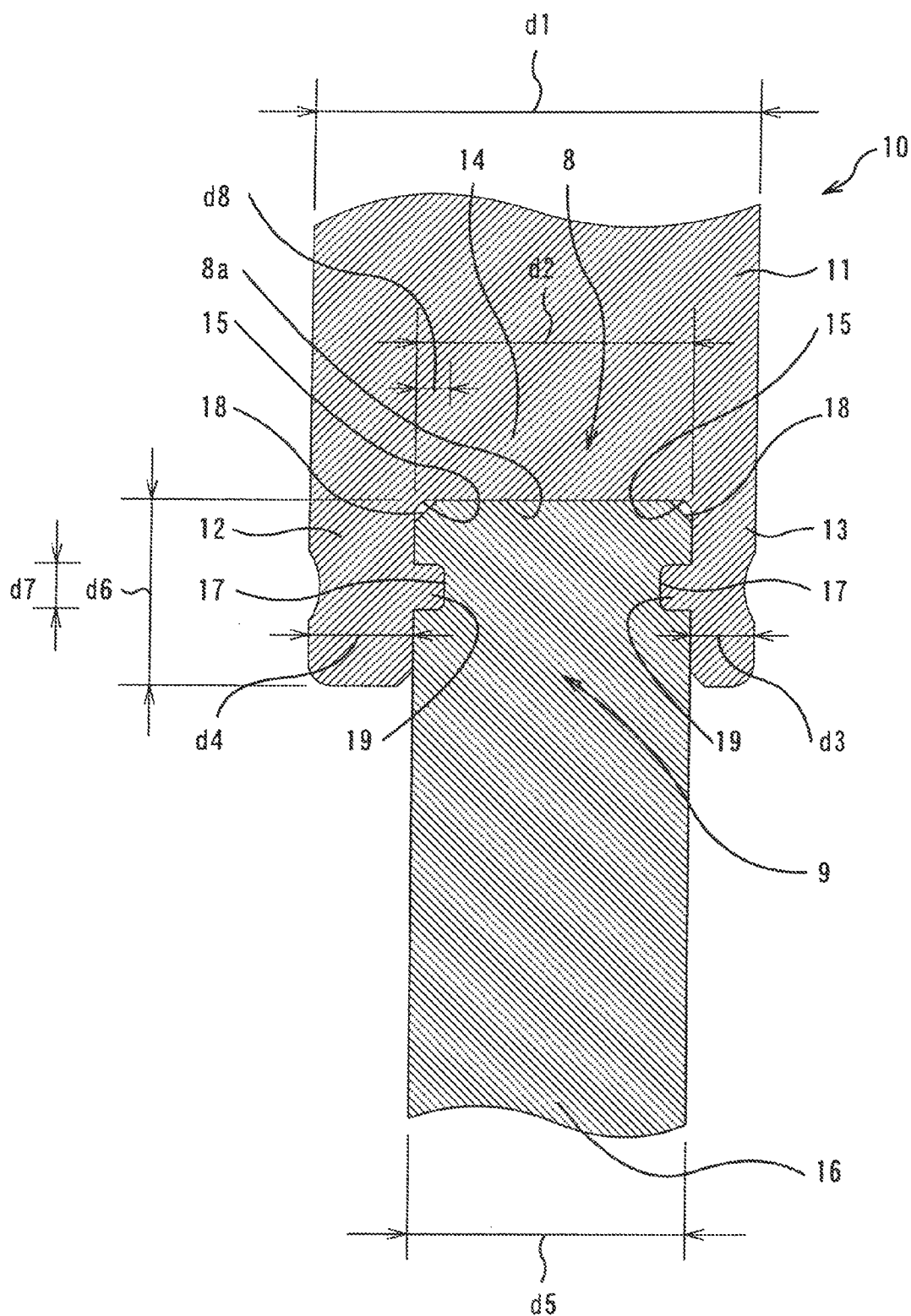
FIG. 6 is a cross-sectional view of the dissimilar joint structure according to Embodiment 1.

FIG. 6 is a cross-sectional view of the dissimilar joint structure 10 manufactured through the above steps. As shown in FIG. 6, the dissimilar joint structure 10 is configured such that the inserting portion 9 is inserted into the inserting groove 8a. Moreover, connecting portions are complicated, and joining portions overlap. Therefore, as compared to a conventional configuration in which flat surfaces face each other, a joining defect is unlikely to occur, and fatigue strength of the dissimilar joint structure 10 improves. Further, even in a case where a periphery of the dissimilar joint structure 10 repeatedly bends, the connecting portions are unlikely to be detached, and the fatigue strength of the periphery of the dissimilar joint structure 10 improves. Since the surface roughness is reduced and the oxide film is removed, the connecting portions are further unlikely to be detached.

By utilizing the friction stir welding, the fluidized metal material constituting the groove forming member 11 gets into the concave groove 17 of the inserting portion 9 and solidifies in the concave groove 17 to be strongly joined to the inserting portion 9. Thus, a convex portion 19 projecting from the surface of the inserting groove 8a into the concave groove 17 is formed at the groove forming member 11. With this, the joint strength between the groove forming member 11 and the inserting portion 9 increases by an anchoring effect.

Moreover, by utilizing the friction stir welding, the size of the dissimilar joint structure 10 can be increased in the longitudinal direction as compared to a case where the explosive cladding is utilized. Therefore, the number of the above-described plurality of curved parts constituting each of the hull supporting member 6 and the tank supporting member 7 can be reduced. On this account, the manufacturing cost of the skirt 4 can be reduced, and the production efficiency of the skirt 4 improves.

Here, the thickness of the groove forming member 11 is denoted by d1 (about 50 to 120 mm), and the width of the inserting groove 8a is denoted by d2 (about 30 to 80 mm). A thickness d3 of the inner side wall portion 13 is smaller than a thickness d4 (=d1−d2−d3) of the outer side wall portion 12 and is smaller than (d1−d2)/2.

In a case where the dissimilar joint structure 10 is applied to the skirt 4, the tank 3 tends to shrink because of the liquefied natural gas which is stored in the tank 3 and very low in temperature, and this causes an upper end portion of the tank supporting member 7 to bend inwardly. The thickness d3 of the inner side wall portion 13 is set such that at this time, the inner side wall portion 13 is not compressed by a low compressive force and does not buckle. The thickness d4 of the outer side wall portion 12 is set such that even if the side wall portion 12 is pulled, it is not damaged. In order to realize this, the thickness d3 is larger than (d1−d2)/4. With this, even if the tank 3 shrinks, the dissimilar joint structure 10 can follow the behavior of the tank 3. Thus, the quality of each of the dissimilar joint structure 10 and the skirt 4 improves.

A thickness d5 of the inserting member 16 is slightly smaller than the width d2 of the inserting groove 8a. A depth d6 of the inserting groove 8a is suitably designed in accordance with the number of concave grooves 17 on each side surface and a height d7 of the concave groove 17. A depth d8 of the concave groove 17 is suitably designed in accordance with the thickness d2 of the inserting member 16.

The surface of the inserting groove 8a and/or the surface of the inserting portion 9 may be subjected to a rust-proofing treatment, such as plating. In this case, a rust preventive film is formed on the treated surface. This rust preventive film can be removed by the metal material stirred by the action of the rotary tool. Since the rust preventive film is removed, the active new surface appears, and the joint strength improves. In addition, since a treatment of removing the rust preventive film can be carried out simultaneously with the joining step, the production efficiency improves.

Figure 7:
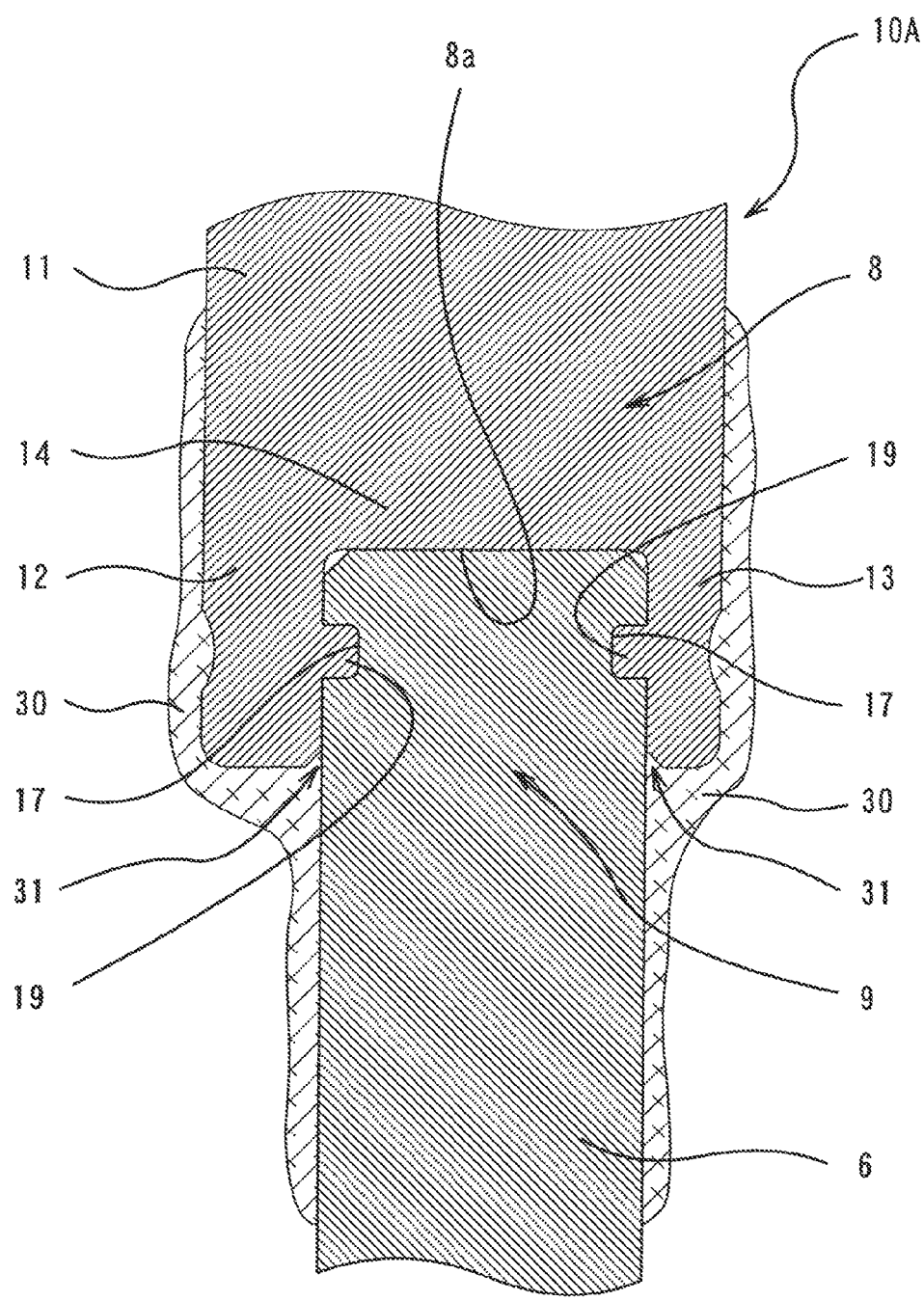
FIG. 7 is a cross-sectional view of the dissimilar joint structure according to Modification Example of Embodiment 1.

FIG. 7 shows a dissimilar joint structure 10A of Modification Example of Embodiment 1. In the present modification example, the same reference numbers are used for the same components as above, and detailed explanations thereof are omitted.

As shown in FIG. 7, in the dissimilar joint structure 10A, a waterproof coating 30 is applied to spread from an outer side surface of the inner side wall portion 13 of the groove forming member 11 to an inner side surface of the inserting member 16. Similarly, the waterproof coating 30 is applied to spread from an outer side surface of the outer side wall portion of the groove forming member 11 to an outer side surface of the inserting member 16. This coating step may be carried out after the groove forming member 11 and the inserting member 16 are coupled to each other by the friction stir welding.

With this, a boundary portion 31 between the groove forming member 11 and the inserting member 16 is covered with the waterproof coating 30. Therefore, moisture can be prevented from getting into the inserting groove 8a through the boundary portion 31. With this, electrolytic corrosion of the dissimilar joint structure 10A can be prevented.

Embodiment 2

Figure 8:
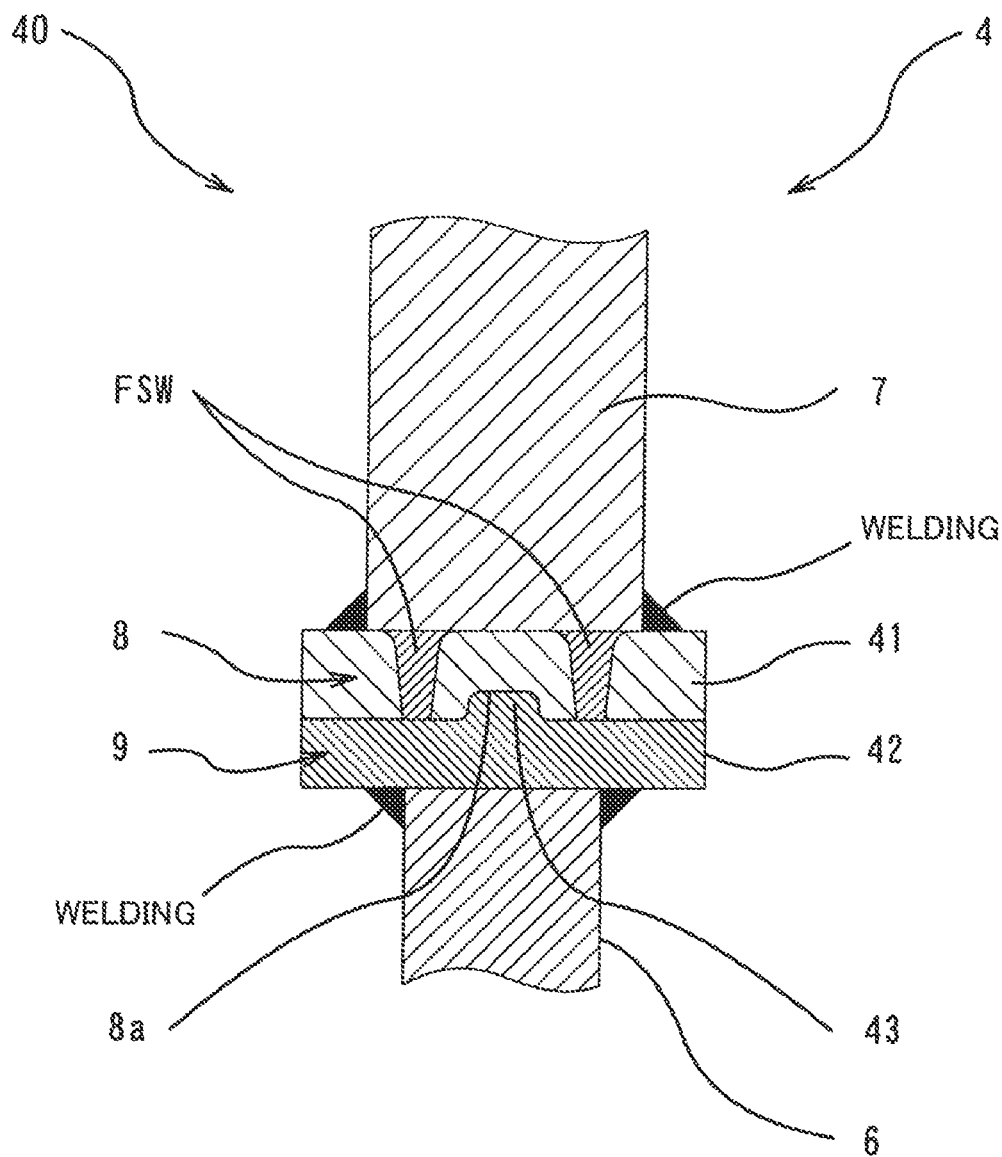
FIG. 8 is a cross-sectional view of the dissimilar joint structure according to Embodiment 2.

FIG. 8 shows a dissimilar joint structure 40 of Embodiment 2. In the present embodiment, the same reference numbers are used for the same components as above, and detailed explanations thereof are omitted. The dissimilar joint structure 40 includes the groove forming portion 8 formed separately from the tank supporting member 7 and the inserting portion 9 formed separately from the hull supporting member 6.

The groove forming portion 8 is constituted by a groove forming member 41. Although the groove forming member 41 is formed separately from the tank supporting member 7, it is made of a metal material, such as the Al—Mn alloy, that is the same as a metal material of the tank supporting member 7. The groove forming member 41 is formed to have a flat plate shape, and the width of the groove forming member 41 is larger than the thickness of the tank supporting member 7. In a case where an upper end surface of the groove forming member 41 is caused to face the lower end surface of the tank supporting member 7, the upper end surface of the groove forming member 41 projects toward both sides with respect to the tank supporting member 7. At this projecting portion, connecting portions of the members 7 and 41 are welded to each other by fillet welding. Since the members 7 and 41 are made of the same metal material, this welding can be carried out easily.

The single-thread inserting groove 8a extending in the longitudinal direction, that is, in the circumferential direction of the tank supporting member 7 is formed on a lower end surface of the groove forming member 41.

The inserting portion 9 is constituted by an inserting member 42. Although the inserting member 42 is formed separately from the hull supporting member 6, it is made of a metal material, such as stainless steel, that is the same as a metal material of the hull supporting member 6 by hot rolling. The inserting member 42 is formed to have a flat plate shape. The width of the inserting member 41 is substantially the same as the width of the groove forming member 41 and is larger than the thickness of the hull supporting member 6. In a case where a lower end surface of the inserting member 42 is caused to face the upper end surface of the hull supporting member 6, the lower end surface of the groove forming member 41 projects toward both sides with respect to the hull supporting member 6. At this projecting portion, connecting portions of the members 6 and 42 are welded to each other by fillet welding. Since the members 6 and 42 are made of the same metal material, this welding can be carried out easily.

The concave groove 8a extending in the longitudinal direction, that is, the circumferential direction of the hull supporting member 6 is formed on each side surface of the inserting member 42. As shown, the concave groove 8a has a U-shaped cross section. However, the cross-sectional shape of the concave groove may be the other shape, such as a semicircular shape. Moreover, as shown, only one concave groove 8a is formed on each side surface. However, a plurality of concave grooves may be formed on each side surface.

A convex portion 43 extending in the longitudinal direction, that is, the circumferential direction of the hull supporting member 6 is formed on an upper end surface of the inserting member 42. The convex portion 43 forms the inserting portion 9.

In accordance with the method for joining the hull supporting member 6 and the tank supporting member 7 by utilizing the dissimilar joint structure 40, first, the inserting portion 9 formed by the inserting member 42 is inserted into the inserting groove 8a of the groove forming member 41. Thus, the groove forming member 41 is attached to the inserting member 42.

Next, the rotary tool (not shown) of the friction stir welding apparatus is pressed against the upper end surface of the groove forming member 41 and is caused to move toward the inserting member 42. Further, the rotary tool is caused to move along the longitudinal direction of the groove forming member 41. In the present embodiment, the positions against which the rotary tool is pressed are two positions which are located on the upper end surface of the groove forming member 41 and sandwich a position corresponding to the inserting groove 8a and the inserting portion 9.

Again, in the present embodiment, since the joining portions overlap each other, it is possible to provide the dissimilar joint structure having high fatigue strength.

The same operational advantages as Embodiment 1 can be obtained by suitably carrying out the surface treatment of the inserting groove 8a and/or the surface treatment of the inserting portion 9, the surface treatment of the lower end surface of the groove forming member 41 and/or the surface treatment of the upper end surface of the inserting member 42 which surfaces are caused to face each other, a round-shape treatment of the corner portion of the inserting groove 8a, the chamfering of the inserting portion 9, and the rust-proofing treatment of the surface of each of the inserting groove 8a and the inserting portion 9.

Figure 9:
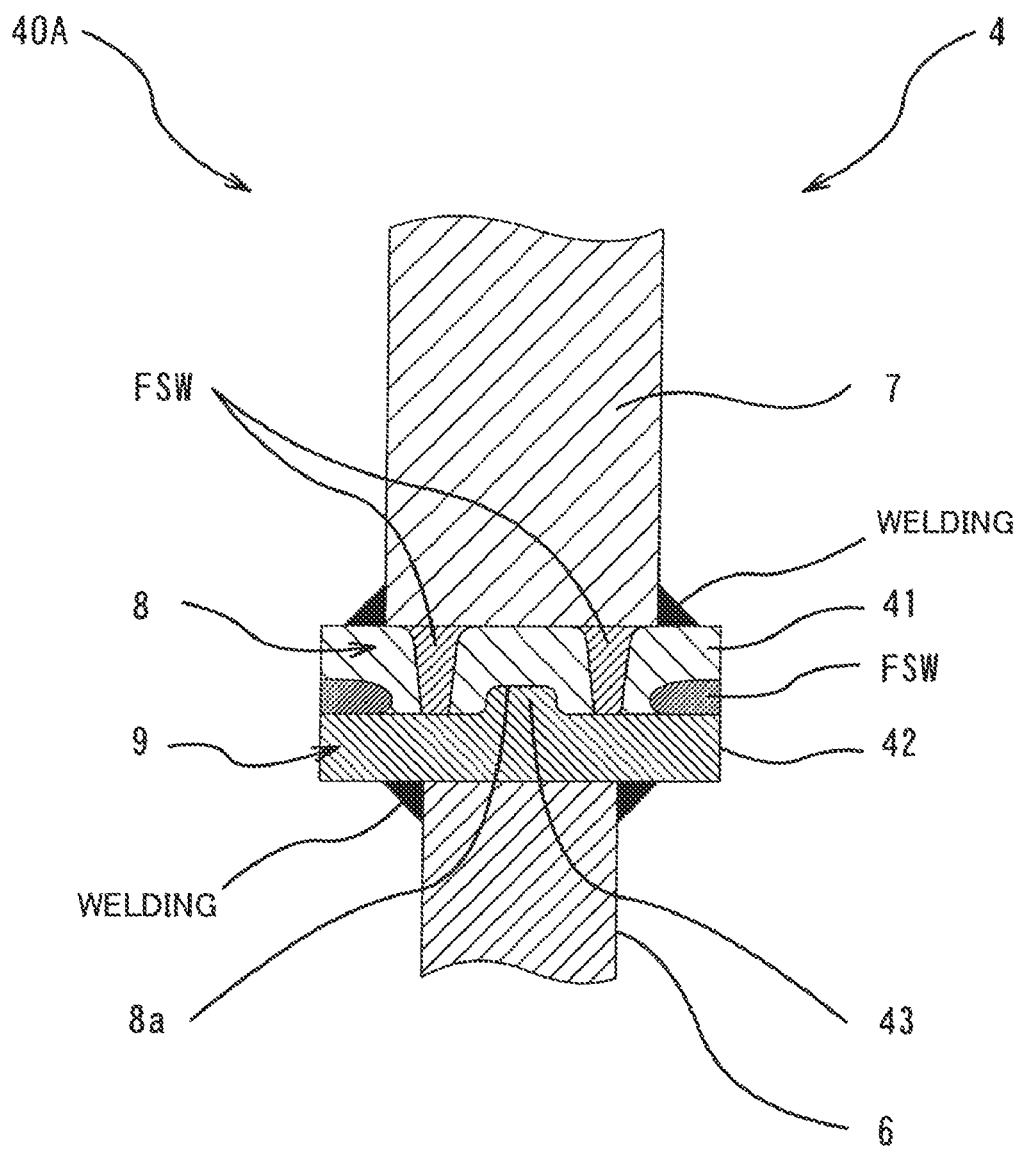
FIG. 9 is a cross-sectional view of the dissimilar joint structure according to Modification Example 1 of Embodiment 2.

FIG. 9 shows a dissimilar joint structure 40A of Modification Example 1 of Embodiment 2. In this modification example, the same components as the dissimilar joint structure 40 (see FIG. 8) configured as above are used. As shown in FIG. 9, the positions against which the rotary tool, not shown, is pressed are not limited to the positions located on the upper surface of the groove forming member 41, and may be positions on both side surfaces of the groove forming member 41. With this, it is possible to further increase the joint strength between a portion of the groove forming member 41 and a portion of the inserting member 42, the portions projecting toward both sides with respect to the tank supporting member 7 and the hull supporting member 6.

Figure 10:
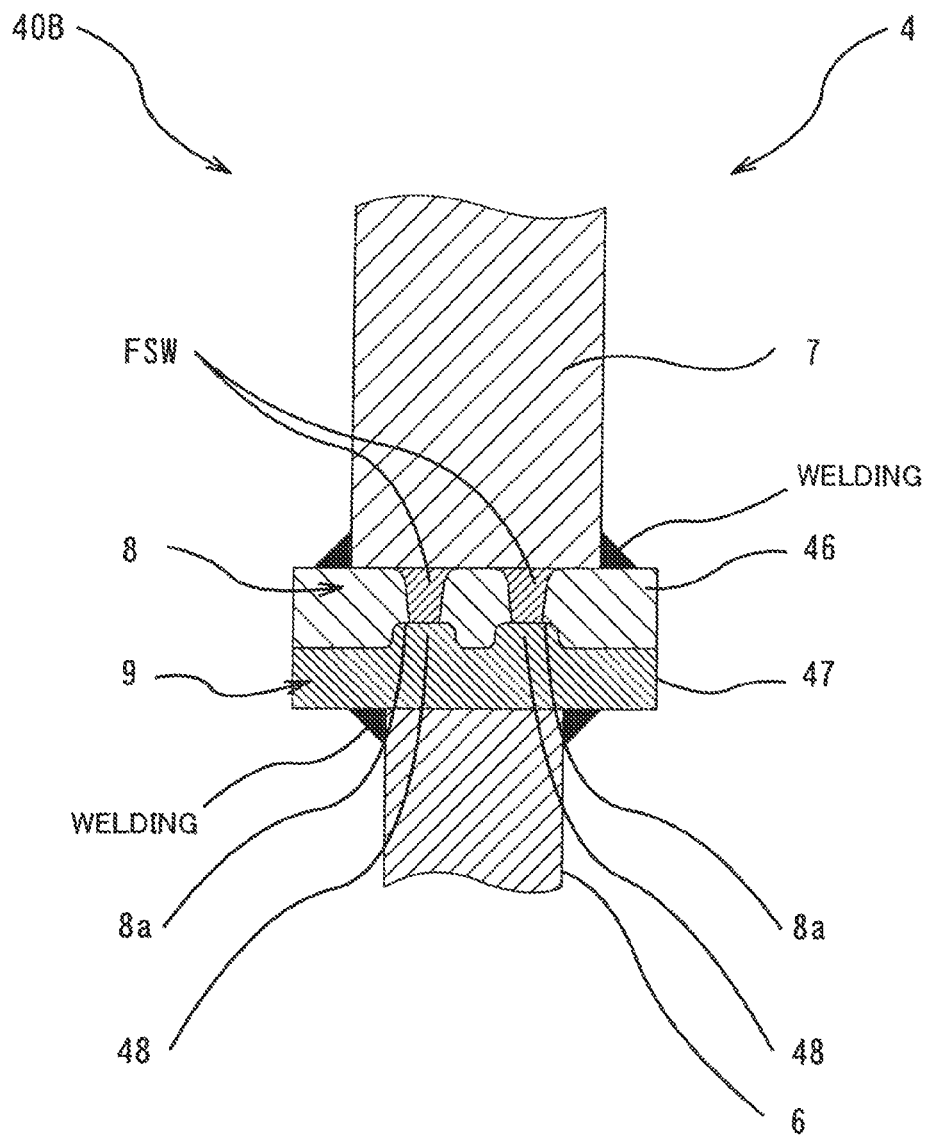
FIG. 10 is a cross-sectional view of the dissimilar joint structure according to Modification Example 2 of Embodiment 2.

FIG. 10 shows a dissimilar joint structure 40B of Modification Example 2 of Embodiment 2. An outer shape of each of a groove forming member 46 and an inserting member 47 of the dissimilar joint structure 40B is the same as an outer shape of each of the groove forming member 41 and the inserting member 47 of the dissimilar joint structure 40B (see FIG. 8) configured as above. Double-threaded inserting grooves 8a are formed on a lower end surface of the groove forming member 46. Two convex portions 48 are formed on an upper end surface of the inserting member 47. The inserting portion 9 is formed such that the convex portions 48 thereof can be inserted into the corresponding inserting grooves 8a.

In accordance with the method for joining the hull supporting member 6 and the tank supporting member 7 by utilizing the dissimilar joint structure 40B, first, the inserting portion 9 formed by the inserting member 47 is inserted into the inserting groove 8a of the groove forming member 46. Thus, the groove forming member 46 is attached to the inserting member 47.

Next, the rotary tool (not shown) of the friction stir welding apparatus is pressed against an upper end surface of the groove forming member 46 and is caused to move toward the inserting member 47. Further, the rotary tool is caused to move along the longitudinal direction. In the present modification example, the positions against which the rotary tool is pressed are two positions which are located on the upper end surface of the groove forming member 46 and correspond to the inserting grooves 8a.

In the present modification example, since a plurality of inserting grooves 8a and a plurality of inserting portions 9 are formed, the joining portions complexly overlap each other. With this, the fatigue strength of the dissimilar joint structure further improves.

The same operational advantages as Embodiment 1 can be obtained by suitably carrying out the surface treatment of the inserting groove 8a and/or the surface treatment of the inserting portion 9, the surface treatment of the lower end surface of the groove forming member 46 and/or the surface treatment of the upper end surface of the inserting member 47 which surfaces are caused to face each other, the round-shape treatment of the corner portion of the inserting groove 8a, the chamfering of the inserting portion 9, and the rust-proofing treatment of the surface of each of the inserting groove 8a and the inserting portion 9.

Figure 11:
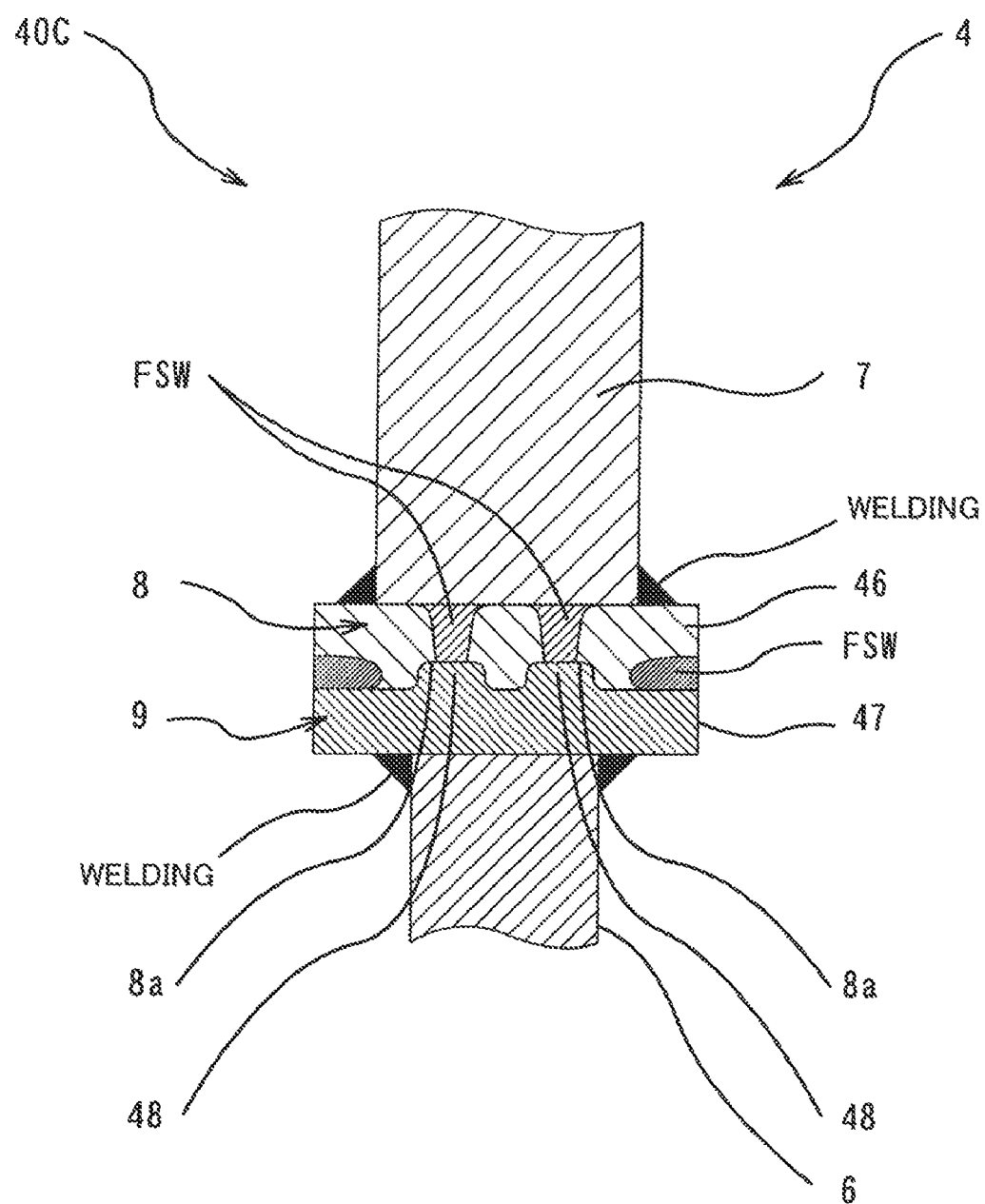
FIG. 11 is a cross-sectional view of the dissimilar joint structure according to Modification Example 3 of Embodiment 2.

FIG. 11 shows a dissimilar joint structure 40C of Modification Example 3 of Embodiment 2. In this modification example, the same components as the dissimilar joint structure 40B (see FIG. 10) of Modification Example 2 are used. As shown in FIG. 11, the positions against which the rotary tool, not shown, is pressed are not limited to the positions located on the upper end surface of the groove forming member 46, and may be positions on both side surfaces of the groove forming member 46. With this, it is possible to increase the joint strength between a portion of the groove forming member 46 and a portion of the inserting member 47, the portions projecting toward both sides with respect to the tank supporting member 7 and the hull supporting member 6.

Figure 12:
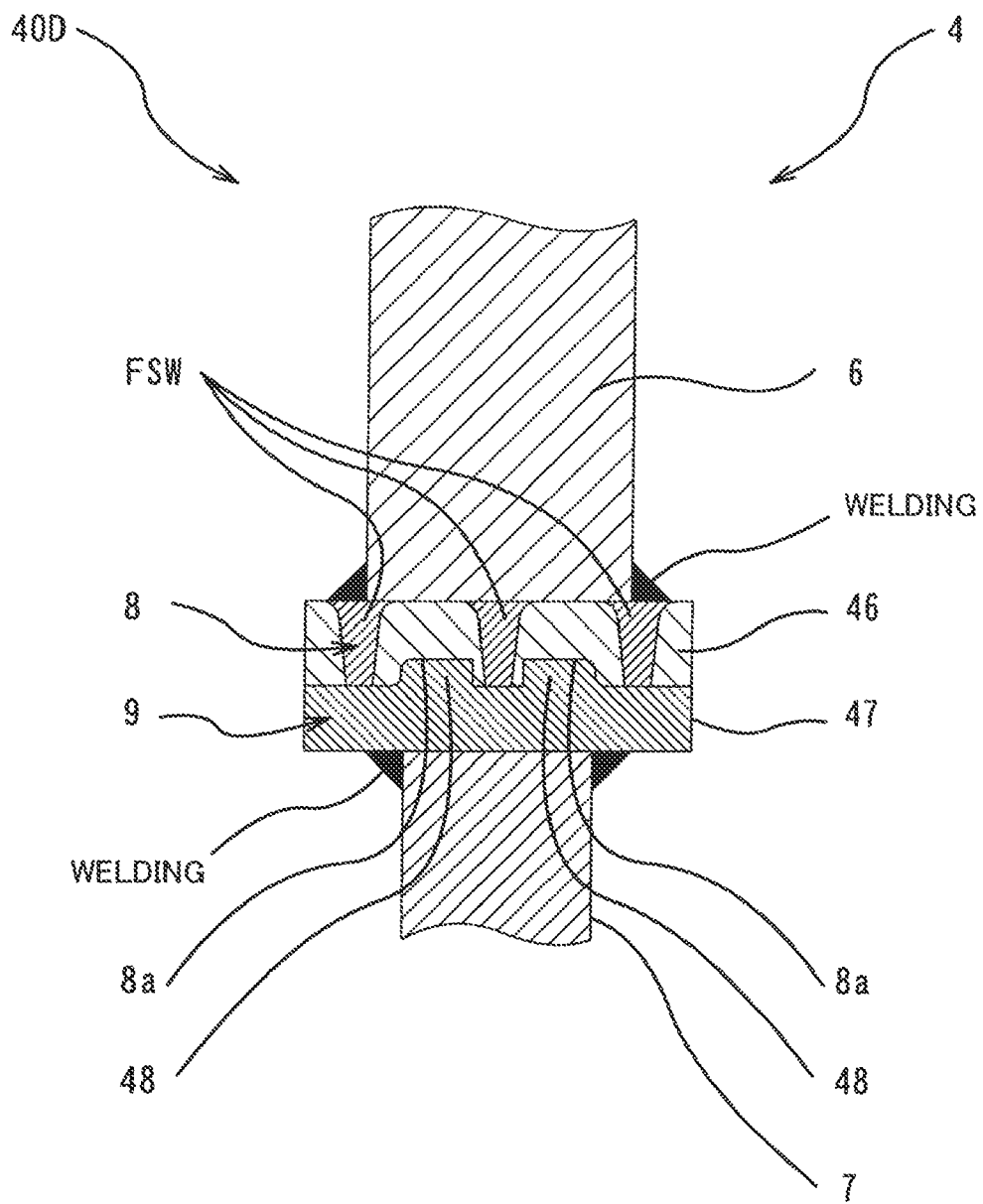
FIG. 12 is a cross-sectional view of the dissimilar joint structure according to Modification Example 4 of Embodiment 2.

FIG. 12 shows a dissimilar joint structure 40D of Modification Example 4 of Embodiment 2. In this modification example, the same components as the dissimilar joint structure 40B (see FIG. 10) of Modification Example 2 are used. As shown in FIG. 12, the positions against which the rotary tool, not shown, is pressed are not limited to two positions which are located on the upper end surface of the groove forming member 46 and correspond to the inserting grooves 8a. The positions against which the rotary tool is pressed may be three positions that are a position between two positions corresponding to the inserting grooves 8a and positions outside these two positions. With this, it is possible to increase the joint strength between a portion of the groove forming member 46 and a portion of the inserting member 47, the portions projecting toward both sides with respect to the tank supporting member 7 and the hull supporting member 6 and the joint strength at the center portion.

Embodiment 3

Figure 13:
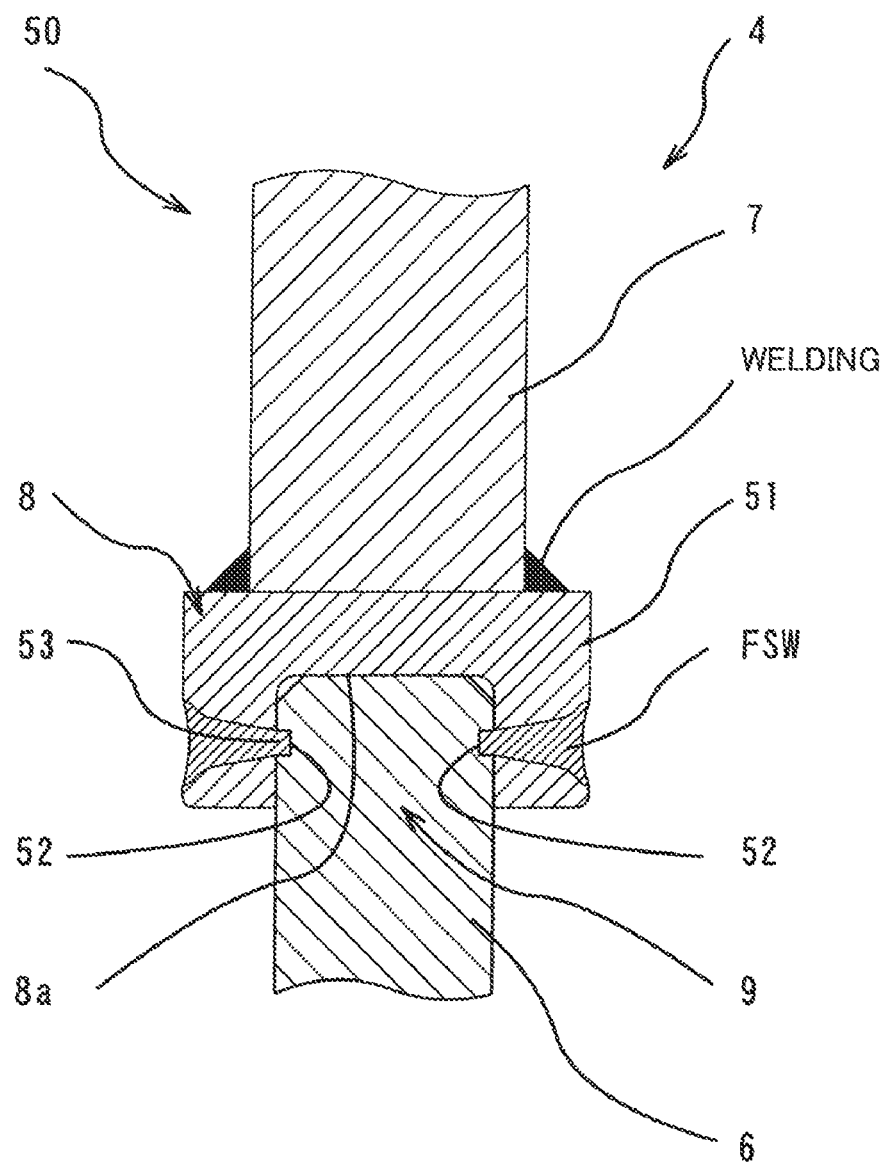
FIG. 13 is a cross-sectional view of the dissimilar joint structure according to Embodiment 3.

FIG. 13 shows a dissimilar joint structure 50 of Embodiment 3. In the present embodiment, the same reference numbers are used for the same components as above, and detailed explanations thereof are omitted. The dissimilar joint structure 50 includes the groove forming portion 8 formed separately from the tank supporting member 7 and the inserting portion 9 formed at the hull supporting member 6.

The groove forming portion 8 is constituted by a groove forming member 51. Although the groove forming member 51 is formed separately from the tank supporting member 7, it is made of a metal material, such as an Al—Mn alloy, that is the same as a metal material of the tank supporting member 7. The groove forming member 51 is formed to have a flat plate shape. The width of the groove forming member 51 is larger than the thickness of the tank supporting member 7. In a case where an upper end surface of the groove forming member 51 is caused to face the lower end surface of the tank supporting member 7, the upper end surface of the groove forming member 51 projects toward both sides with respect to the tank supporting member 7. At this projecting portion, connecting portions of the members 7 and 51 are welded to each other by fillet welding. Since the members 7 and 51 are made of the same metal material, this welding can be carried out easily.

The single-thread inserting groove 8a extending in the longitudinal direction, that is, the circumferential direction of the tank supporting member 7 is formed on a lower end surface of the groove forming member 51. The inserting groove 8a is formed so as to be able to receive the upper end portion of the hull supporting member 6 which portion serves as the inserting portion 9.

The inserting portion 9 is formed at the upper end portion of the hull supporting member 6. A concave groove 52 extending in the longitudinal direction, that is, the circumferential direction of the hull supporting member 6 is formed on each side surface of the inserting portion 9. As shown, only one concave groove 52 may be formed on each side surface. However, a plurality of concave grooves may be formed on each side surface.

In accordance with the method for joining the hull supporting member 6 and the tank supporting member 7 by utilizing the dissimilar joint structure 50, first, the upper end portion of the hull supporting member 6, that is, the inserting portion 9 is inserted into the inserting groove 8a of the groove forming member 51.

Next, the rotary tool (not shown) of the friction stir welding apparatus is pressed against the side surface of the groove forming member 51. The position against which the rotary tool is pressed is the position which is located on each side surface of the groove forming member 51 and corresponds to the concave groove 52. The rotary tool is caused to move toward the inserting portion 9 and is further caused to move along the longitudinal direction.

Again, in the present embodiment, since the joining portions overlap each other, it is possible to provide the dissimilar joint structure having high fatigue strength. Moreover, since the fluidized metal material forming the groove forming member 51 gets into the concave groove 52 to form a convex portion 53, high joint strength can be obtained by the anchoring effect.

Moreover, in the present embodiment, the inserting portion 9 is formed integrally with the hull supporting member 6. Therefore, as compared to a case where the inserting portion 9 is constituted by a member formed separately from the hull supporting member 6 as in Embodiments 1 and 2, the present embodiment is advantageous in that the welding operation can be omitted.

The same operational advantages as Embodiment 1 can be obtained by suitably carrying out the surface treatment of the inserting groove 8a and/or the surface treatment of the inserting portion 9, the round-shape treatment of the corner portion of the inserting groove 8a, the chamfering of the inserting portion 9, and the rust-proofing treatment of the surface of each of the inserting groove 8a and the inserting portion 9.

Figure 14:
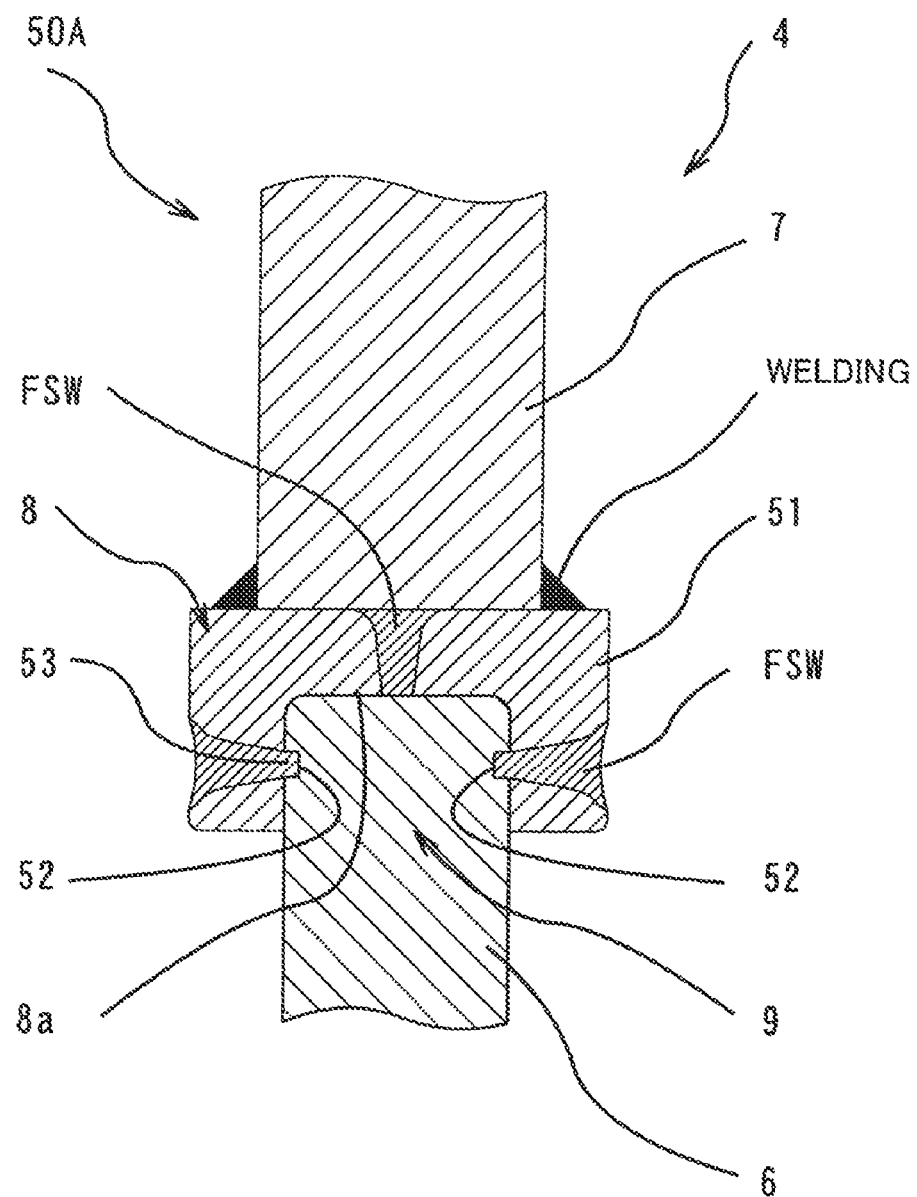
FIG. 14 is a cross-sectional view of the dissimilar joint structure according to Modification Example 1 of Embodiment 3.

FIG. 14 shows a dissimilar joint structure 50A of Modification Example 1 of Embodiment 3. In this modification example, the same components as the dissimilar joint structure 50 (see FIG. 13) configured as above are used. As shown in FIG. 14, the position against which the rotary tool, not shown, is pressed is not limited to the position on each side surface of the groove forming member 51 but may be the position which is located on the upper end surface of the groove forming member 51 and corresponds to the inserting portion 9. With this, it is possible to further increase the joint strength between the groove forming member 51 and the inserting portion 9.

Figure 15:
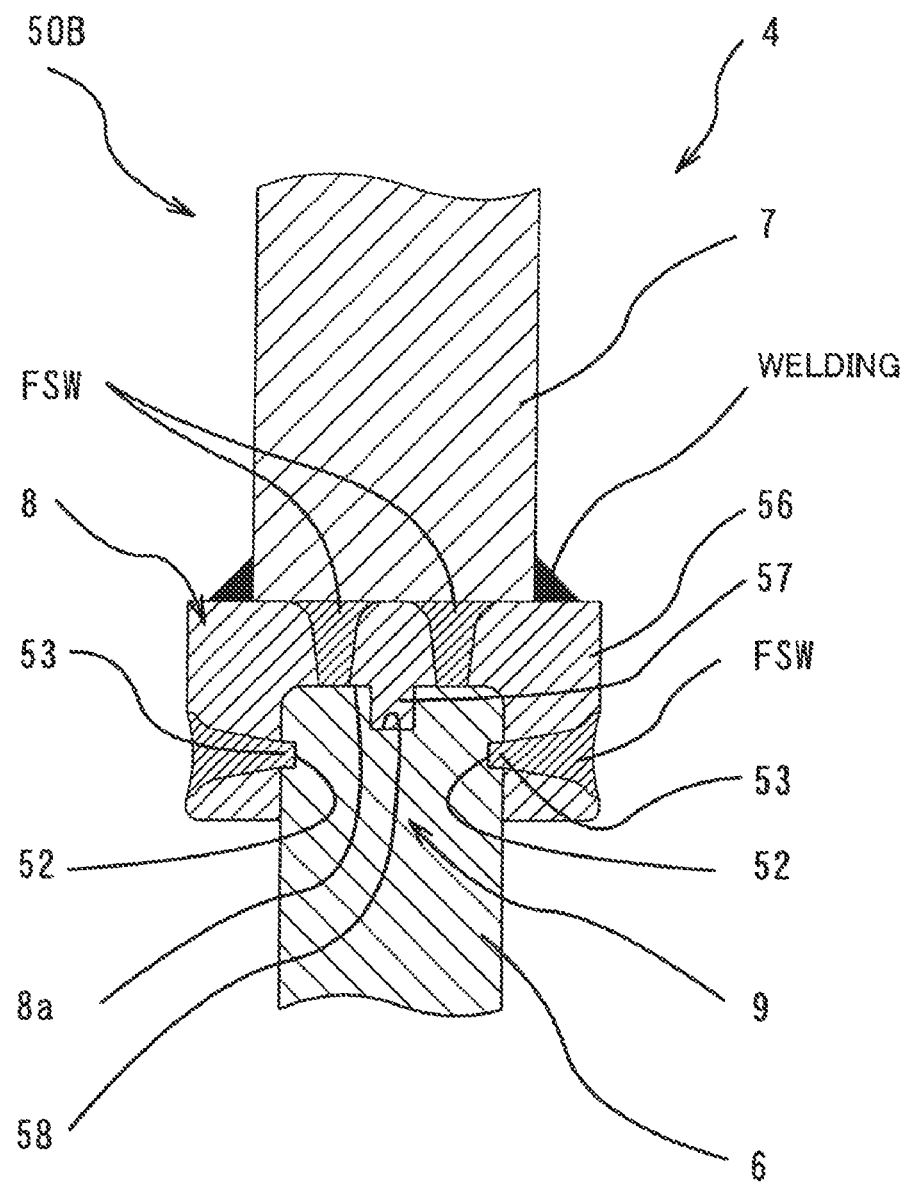
FIG. 15 is a cross-sectional view of the dissimilar joint structure according to Modification Example 2 of Embodiment 3.

FIG. 15 shows a dissimilar joint structure 50B of Modification Example 2 of Embodiment 3. An outer shape of a groove forming member 56 constituting the dissimilar joint structure 50B is the same as an outer shape of the groove forming member 56 of the dissimilar joint structure 50 (see FIG. 13) configured as above. A convex portion 57 projecting from the surface of the inserting groove 8a toward an opening of the inserting groove 8a is formed at a lower end surface of the groove forming member 56. A concave portion 58 is formed on an upper end surface of the inserting portion 9 so as to be able to fit the convex portion 57. As with the dissimilar joint structure 50 (see FIG. 13) configured as above, the inserting portion 9 is formed at the upper end portion of the hull supporting member 6.

In accordance with the method for joining the hull supporting member 6 and the tank supporting member 7 by utilizing the dissimilar joint structure 50B, first, the groove forming member 56 and the hull supporting member 6 configured as above are manufactured to form the inserting groove 8a and the inserting portion 9. At this time, the convex portion 57 is formed at the groove forming member 56, and the concave groove 52 and the concave portion 58 are formed at the upper end portion of the hull supporting member 6. The inserting portion 9 of the hull supporting member 6 is inserted into the inserting groove 8a of the groove forming member 56. Thus, the groove forming member 56 is attached to the upper end portion of the hull supporting member 6. At this time, the convex portion 57 fits in the concave portion 58.

Next, the rotary tool (not shown) of the friction stir welding apparatus is pressed against an upper end surface of the groove forming member 56 and is caused to move toward the inserting portion 9. Further, the rotary tool is caused to move along the longitudinal direction. In the present modification example, the positions against which the rotary tool is pressed are four positions including two positions located on the side surfaces of the groove forming member 56 and correspond to the concave grooves 52 and two positions located on the upper end surface of the groove forming member 56, and sandwich the position corresponding to the concave portion 52.

In the present modification example, the convex portion 57 is formed to project in the inserting groove 8a, and the concave portion 58 is formed at the inserting portion 9 so as to fit the convex portion 57. Therefore, the joining portions complexly overlap each other, and this can further improve the fatigue strength of the dissimilar joint structure. Moreover, since the number of portions subjected to the friction stir welding is increased, the joint strength between the groove forming member 56 and the inserting portion 9 further improves.

The same operational advantages as Embodiment 1 can be obtained by suitably carrying out the surface treatment of the inserting groove 8a and/or the surface treatment of the inserting portion 9, the round-shape treatment of the corner portion of the inserting groove 8a, the chamfering of the inserting portion 9, and the rust-proofing treatment of the surface of each of the inserting groove 8a and the inserting portion 9.

Figure 16:
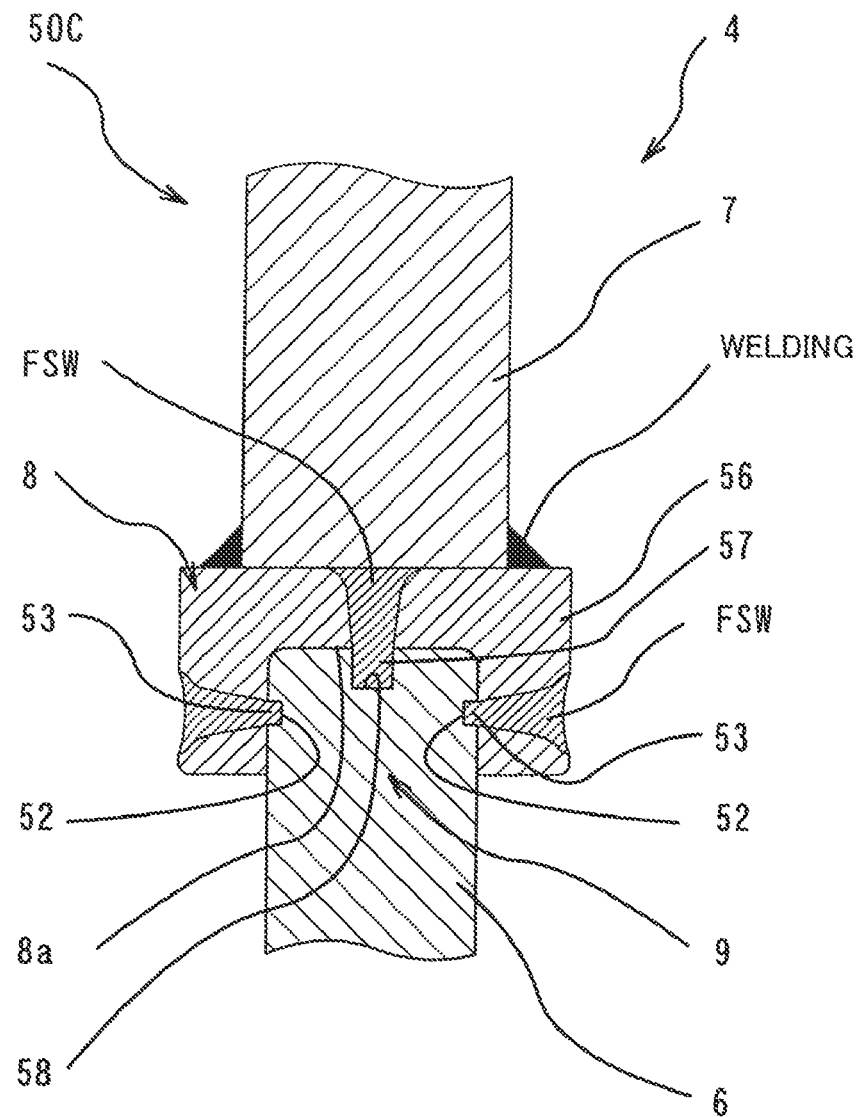
FIG. 16 is a cross-sectional view of the dissimilar joint structure according to Modification Example 3 of Embodiment 3.

FIG. 16 shows a dissimilar joint structure 50C of Modification Example 3 of Embodiment 3. In this modification example, the same components as the dissimilar joint structure 50B (see FIG. 15) configured as above are used. As shown in FIG. 16, the positions against which the rotary tool, not shown, is pressed are three positions including the positions which are located on the side surfaces of the groove forming member 56 and correspond to the concave grooves 52 and the position which is located on the upper end surface of the groove forming member 56 and corresponds to the concave portion 58. With this configuration, it is possible to provide the dissimilar joint structure 50C having high joint strength.

Embodiment 4

Figure 17:
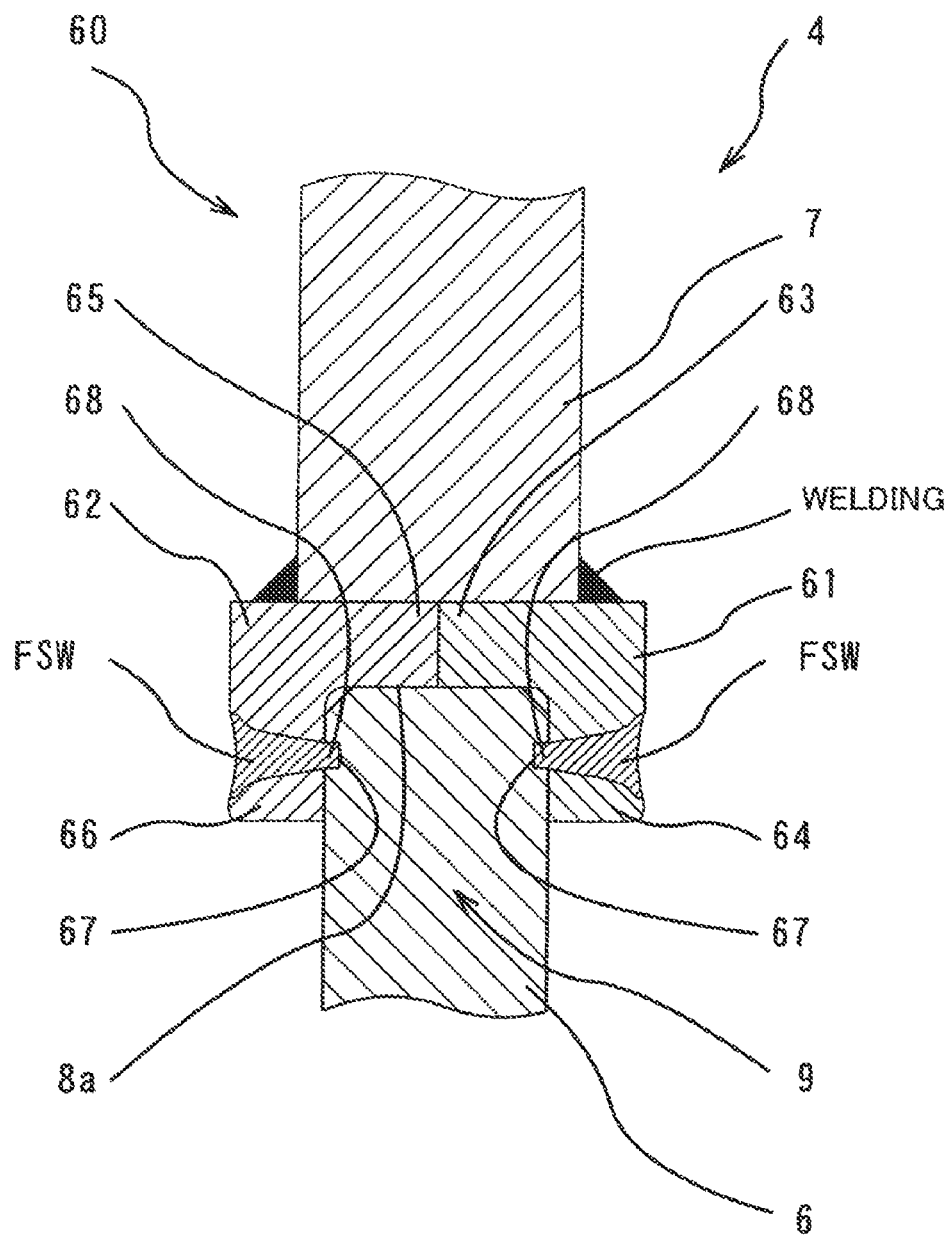
FIG. 17 is a cross-sectional view of the dissimilar joint structure according to Embodiment 4.

FIG. 17 is the dissimilar joint structure of Embodiment 4. In the present embodiment, the same reference numbers are used for the same components as above, and detailed explanations thereof are omitted. A dissimilar joint structure 60 includes the groove forming portion 8 formed separately from the tank supporting member 7 and the inserting portion 9 formed at the hull supporting member 6.

As shown in FIG. 17, the groove forming portion 8 of the dissimilar joint structure 60 is constituted by a first groove forming member 61 and a second groove forming member 62. Each of the first and second groove forming members 61 and 62 is formed to have an L-shaped cross section. The first groove forming member 61 includes a base portion 63 and a side wall portion 64 extending vertically with respect to the base portion 63. Similarly, the second groove forming member 62 includes a base portion 65 and a side wall portion 66. The thickness of the side wall portion 64 of the first groove forming member 61 and the thickness of the side wall portion 65 of the second groove forming member 62 may be the same as each other for the purpose of achieving commonality of parts. Moreover, as with the above, the thickness of the side wall portion 64 provided on the inner side may be smaller than the thickness of the side wall portion 66 provided on the outer side.

By causing end surfaces of the base portions of the first and second groove forming members 61 and 62 to face each other, the inserting groove 8a capable of receiving the inserting portion 9 formed at the upper end portion of the hull supporting member 6 is formed by inner surfaces of the base portions and inner surfaces of the side wall portions 64 and 66. To be specific, the first and second groove forming members are formed by dividing the groove forming member 56 of the U-shaped cross section of Embodiment 3 shown in FIG. 13 in half.

The inserting portion 9 is formed at the upper end portion of the hull supporting member 6, and a concave groove 67 extending in the longitudinal direction is formed on each side surface of the inserting portion 9.

In accordance with the method for joining the hull supporting member 6 and the tank supporting member 7 by utilizing the dissimilar joint structure 60, first, the first groove forming member 61 covers an inner side surface of the inserting portion 9. At this time, the upper end surface of the inserting portion 9 is caused to contact an inner surface of the base portion 63 of the first groove forming member 61.

Then, the rotary tool (not shown) of the friction stir welding apparatus is pressed against an outer surface of the first groove forming member 61. The position against which the rotary tool is pressed is the position which is located on an outer surface of the side wall portion 64 of the first groove forming member 61 and corresponds to the concave groove 67. The rotary tool is caused to move toward the inserting portion 9 and is further caused to move along the longitudinal direction. With this, the first groove forming member 61 is joined to the inner side surface of the inserting portion 9. The fluidized metal material forming the first groove forming member 61 thoroughly gets into the concave groove 67 of the inserting portion 9. Therefore, a convex portion 68 projecting into the concave groove 67 is formed at the first groove forming member 61. Thus, the first groove forming member 61 is strongly joined to the inserting portion 9 by the anchoring effect.

Next, the second groove forming member 62 covers an outer side surface of the inserting portion 9. At this time, the upper end surface of the inserting portion 9 is caused to contact an inner surface of the base portion 65 of the second groove forming member 62. Then, as with the first groove forming member 61, the second groove forming member 62 is joined to the inserting portion 9.

As above, the first and second groove forming members 61 and 62 cover respective side surfaces of the inserting portion 9, and the inserting portion 9 is inserted into the inserting groove 8a formed inside the first and second groove forming members 61 and 62.

Next, the lower end portion of the tank supporting member 7 is welded to the base portions 63 and 65 of the first and second groove forming members 61 and 62. Since the thickness of the tank supporting member 7 is smaller than a distance from an end portion of one of the base portions to an end portion of the other base portion, the base portions project with respect to the tank supporting member. The fillet welding is carried out at this projecting portion. Since the tank supporting member 7 and the first and second groove forming members 61 and 62 are made of the same metal, this welding can be carried out easily.

Again, in the present embodiment, the joining portions overlap each other. Therefore, it is possible to provide the dissimilar joint structure having high fatigue strength.

Moreover, in the present embodiment, the inserting portion 9 is formed integrally with the hull supporting member 6. Therefore, as compared to a case where the inserting portion 9 is constituted by a member formed separately from the hull supporting member 6 as in Embodiments 1 and 2, the present embodiment is advantageous in that a welding operation can be omitted.

Moreover, in the present embodiment, the groove forming member is divided in half, and the inserting groove does not have to be formed at a single component. Therefore, a component for forming the inserting groove can be manufactured more simply than Embodiments 1 to 3.

The same operational advantages as Embodiment 1 can be obtained by suitably carrying out the treatment of the surfaces forming the inserting groove 8a and/or the surface treatment of the inserting portion 9, the round-shape treatment of the corner portion formed between the inner surface of the side wall portion 64 and the inner surface of the base portion 63, the round-shape treatment of the corner portion formed between the inner surface of the side wall portion 65 and the inner surface of the base portion 65, the chamfering of the inserting portion 9, the rust-proofing treatment of the surfaces forming the inserting groove 8a, and the rust-proofing treatment of the surface of the inserting portion 9.

Embodiment 5

Figure 18:
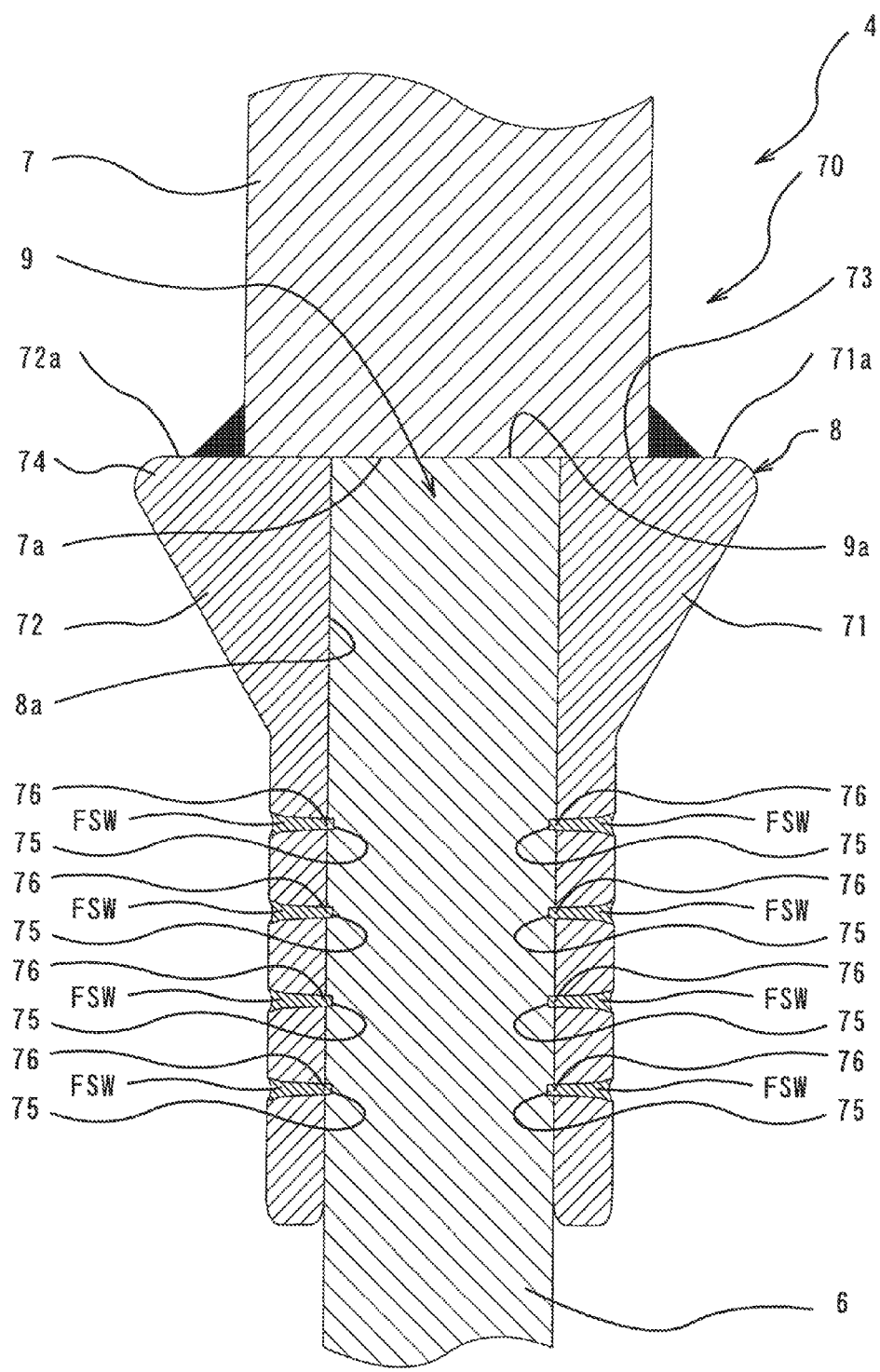
FIG. 18 is a cross-sectional view of the dissimilar joint structure according to Embodiment 5.

FIG. 18 shows a dissimilar joint structure 70 of Embodiment 5. In the present embodiment, the same reference numbers are used for the same components as above, and detailed explanations thereof are omitted. The dissimilar joint structure 70 includes the groove forming portion 8 and the inserting portion 9. The groove forming portion 8 includes the tank supporting member 7 and a member formed separately from the tank supporting member 7. The inserting portion 9 is formed at the hull supporting member 6.

As shown in FIG. 18, the groove forming portion 8 of the dissimilar joint structure 70 is constituted by the lower end portion of the tank supporting member 7, a first groove forming member 71, and a second groove forming member 72. The tank supporting member 7 and the first and second groove forming members 71 and 72 are made of the same metal. Moreover, the shapes of the first and second groove forming members 71 and 72 may be the same as each other for the purpose of achieving commonality of parts. Moreover, as described above, the thickness of the first groove forming member 71 constituting the inner side wall portion 13 may be smaller than the thickness of the second groove forming member 72 constituting the outer side wall portion 12.

An inner side surface of the first groove forming member 71 is formed as a curved surface having the same curvature as an inner side surface of the hull supporting member 6 so as to cover the inner side surface of the inserting portion 9 constituted by the end portion of the hull supporting member 6. An outer side surface of the second groove forming member 72 is formed as a curved surface having the same curvature as an outer side surface of the hull supporting member 6 so as to cover the outer side surface of the inserting portion 9 constituted by the end portion of the hull supporting member 6.

The first groove forming member 71 is formed such that the thickness thereof increases from a vertically center portion thereof toward an upper side, and an outer side surface of the first groove forming member 71 is a tapered shape. Therefore, an upper end portion of the first groove forming member 71 forms a flange portion 73 projecting toward a side opposite the inner side surface side. Similarly, a flange portion 74 is formed at an upper end portion of the second groove forming member 72. When forming the flange portions 73 and 74, the cross-sectional shape of each of the first and second groove forming members 71 and 72 is formed to be a tapered shape. With this, the stress concentration acting on the flange portions 73 and 74 can be decreased as compared to a case where the cross-sectional shape is formed to be a hook shape.

As described above, the inserting portion 9 is constituted by the end portion of the hull supporting member 6. A plurality of concave grooves 75 vertically arranged are formed on each side surface of the inserting portion 9.

In accordance with the method for joining the hull supporting member 6 and the tank supporting member 7 by utilizing the dissimilar joint structure 70, first, the inner side surface of the first groove forming member 71 covers the inner side surface of the inserting portion 9. At this time, the first groove forming member 71 is arranged such that an upper end surface 9a of the inserting portion 9 is flush with an upper end surface (that is, an upper end surface of the flange portion 73) 71a of the first groove forming member 71.

Next, the rotary tool (not shown) of the friction stir welding apparatus is pressed against an outer surface of the first groove forming member 71. The positions against which the rotary tool is pressed are positions (four positions in the present embodiment) which are located on the side surface of the first groove forming member 71 and correspond to respective concave grooves 75. The rotary tool is caused to move toward the inserting portion 9 and is further caused to move along the longitudinal direction. With this, the first groove forming member 71 is joined to the inner side surface of the inserting portion 9. The fluidized metal material forming the first groove forming member 71 thoroughly gets into the concave grooves 75 of the inserting portion 9. Therefore, convex portions 76 projecting into the concave grooves 75 are formed at the first groove forming member 71. Thus, the first groove forming member 71 is strongly joined to the inserting portion by the anchoring effect.

Next, an inner side surface of the second groove forming member 72 covers the outer side surface of the inserting portion 9. At this time, the second groove forming member 72 is arranged such that the upper end surface 9a of the inserting portion 9 is flush with an upper end surface (that is, an upper end surface of the flange portion 74) 72a of the second groove forming member 72. Then, the rotary tool (not shown) of the friction stir welding apparatus is pressed against an outer surface of the second groove forming member 72. Thus, as with the above, the second groove forming member 72 is joined to the outer side surface of the inserting portion 9. The fluidized metal material forming the second groove forming member 72 thoroughly gets into the concave grooves 75 of the inserting portion 9. Therefore, the convex portions 76 projecting into the concave grooves 75 are formed at the second groove forming member 72. Thus, the second groove forming member 72 is strongly joined to the inserting portion 9 by the anchoring effect.

Next, as shown in FIG. 18, both corner portions of the lower end portion of the tank supporting member 7 are respectively welded to the upper end portions of the first and second groove forming members 71 and 72. The thickness of the tank supporting member 7 is larger than the thickness of the hull supporting member 6 formed integrally with the inserting portion 9. However, the upper end portions of the first and second groove forming members 71 and 72 respectively include the flange portions 73 and 74 projecting toward the side opposite the inner side surface side. Therefore, in a case where the lower end portion of the tank supporting member 7 is disposed on the upper sides of the first and second groove forming members 71 and 72, the flange portions 73 and 74 project toward both sides with respect to the tank supporting member 7. The fillet welding is easily carried out at this projecting portion. Moreover, since the tank supporting member 7 and the first and second groove forming members 71 and 72 are made of the same metal, this welding can be carried out easily.

In a case where the tank supporting member 7 is joined to the first and second groove forming members 71 and 72 as above, the inserting portion 9 is arranged as if it is inserted into the inserting groove 8a formed by the lower end surface of the tank supporting member 7 and the inner side surfaces of the first and second groove forming members 71 and 72. Therefore, again, in the present embodiment, the joining portions overlap each other. Thus, the dissimilar joint structure having high fatigue strength can be obtained.

Moreover, the upper end surface 9a of the inserting portion 9 is flush with the upper end surfaces 73a and 74a of the first and second groove forming members 71 and 72. In a case where the lower end portion of the tank supporting member 7 is disposed on the upper end surfaces of the first and second groove forming members 71 and 72, a lower end surface 7a of the tank supporting member 7 surely contacts the upper end surface 9a of the inserting portion 9, and the fillet welding is carried out in this state. With this, a load applied from the tank 3 to the tank supporting member 7 is supported by the hull supporting member 6 forming the inserting portion 9. On this account, the fatigue strength of the first and second groove forming members 71 and 72 can be increased.

In the present embodiment, the formation of the inserting groove is unnecessary, unlike Embodiments 1 to 3. In addition, the step of inserting the inserting portion into the preformed inserting groove is unnecessary. Therefore, the dissimilar joint structure can be easily assembled. Further, the chamfering for easily inserting the inserting portion into the inserting groove and the round-shape treatment for avoiding the stress concentration of the corner portion formed by forming the inserting groove are unnecessary. Therefore, the production efficiency improves.

The same operational advantages as Embodiment 1 can be obtained by suitably carrying out the surface treatment of the inner side surfaces of the first and second groove forming members 71 and 72 and the lower end surface of the tank supporting member 7 which surfaces resultingly serve as the surfaces of the inserting groove 8a and/or the surface treatment of the inserting portion 9, and the rust-proofing treatment of the surfaces of the inserting groove 8a and the inserting portion 9.

Embodiment 6

Figure 19:
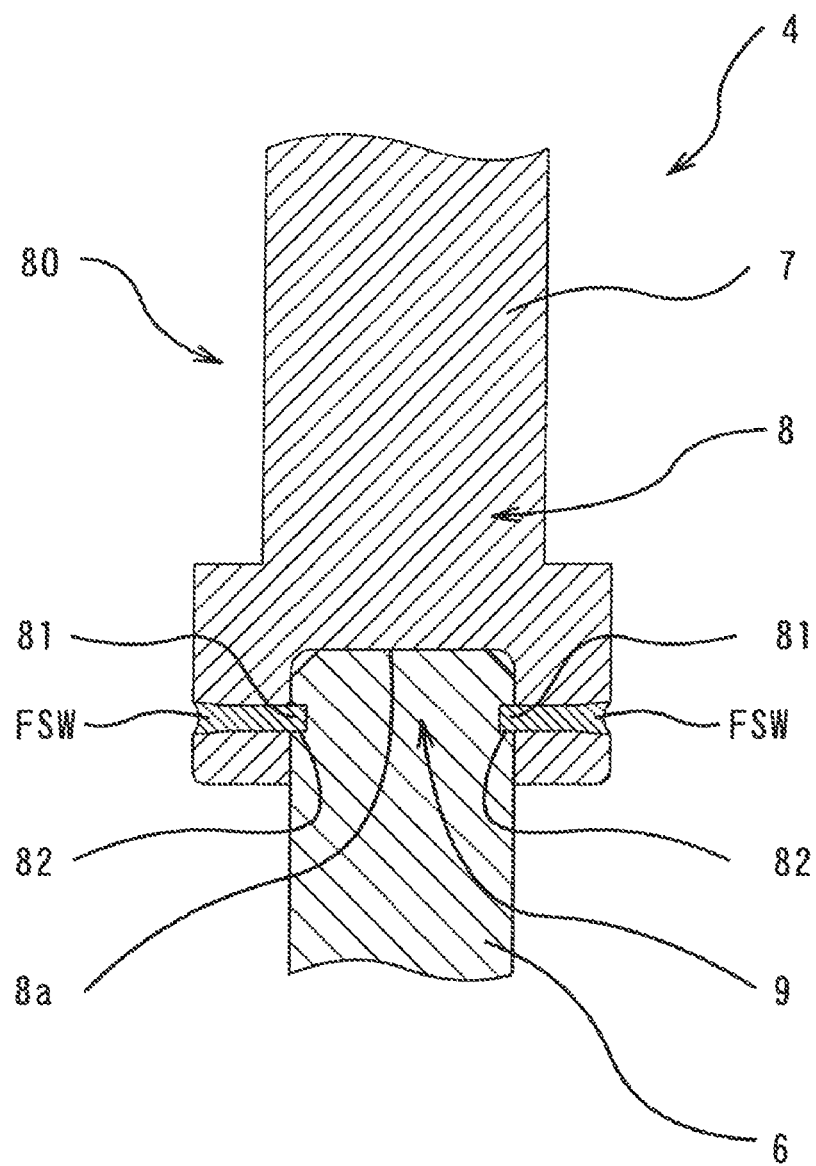
FIG. 19 is a cross-sectional view of the dissimilar joint structure according to Embodiment 6.

FIG. 19 shows a dissimilar joint structure 80 of Embodiment 6. In the present embodiment, the same reference numbers are used for the same components as above, and detailed explanations thereof are omitted. The dissimilar joint structure 80 includes the groove forming portion 8 formed at the tank supporting member 7 and the inserting portion 9 formed at the hull supporting member 6.

The groove forming portion 8 is formed at the lower end portion of the tank supporting member 7. The inserting groove 8a which is upwardly concave is formed at the lower end surface of the tank supporting member 7. The inserting groove 8a extends in the longitudinal direction, that is, the circumferential direction of the tank supporting member. The inserting groove 8a is formed so as to be able to receive the upper end portion of the hull supporting member 6 which portion serves as the inserting portion 9.

The inserting portion 9 is formed at the upper end portion of the hull supporting member 6. A concave groove 81 extending in the longitudinal direction, that is, the circumferential direction of the hull supporting member 6 is formed on each side surface of the inserting portion 9. As shown, only one concave groove 81 may be formed on each side surface. However, a plurality of concave grooves may be formed on each side surface.

In accordance with the method for joining the hull supporting member 6 and the tank supporting member 7 by utilizing the dissimilar joint structure 80, first, the groove forming portion 8 and the inserting portion 9 are respectively formed at the tank supporting member 7 and the hull supporting member, and the inserting portion 9 is inserted into the inserting groove 8a to attach the tank supporting member 7 and the hull supporting member 6. Next, the rotary tool (not shown) of the friction stir welding apparatus is pressed against the side surface of the groove forming portion 8 and is caused to move toward the inserting portion 9. Further, the rotary tool is caused to move along the longitudinal direction. In the present embodiment, the position against which the rotary tool is pressed is a position which is located on the side surface of the groove forming portion 8 and corresponds to the concave groove 81.

In the present embodiment, the groove forming portion 8 is formed integrally with the tank supporting member 7, and the inserting portion 9 is formed integrally with the hull supporting member 6. Therefore, as compared to a case where the groove forming portion 8 is formed by a member formed separately from the tank supporting member 7 and the inserting portion 9 is formed by a member formed separately from the hull supporting member 6 as in Embodiments 1 and 2, the present embodiment is advantageous in that a welding operation can be omitted.

The same operational advantages as Embodiment 1 can be obtained by suitably carrying out the surface treatment of the inserting groove 8a and/or the surface treatment of the inserting portion 9, the round-shape treatment of the corner portion of the inserting groove 8a, the chamfering of the inserting portion 9, and the rust-proofing treatment of the surface of each of the inserting groove 8a and the inserting portion 9.

The foregoing has explained the embodiments of the present invention, but suitable modifications may be made within the spirit of the present invention. For example, roll bonding (anchoring bond) may be adopted instead of the friction stir welding. In this case, with the inserting portion inserted in the inserting groove (in the case of applying this to Embodiment 4, with the first or second groove forming member covering the inserting portion), the groove forming portion and inserting groove are caused to press against each other until the plastic deformation of the groove forming portion and the inserting groove occurs. With this, high shear resistance is generated at a joining interface between the groove forming portion and the inserting groove. Thus, high joint strength can be secured.

Moreover, the material of the tank supporting member, the material of the hull supporting member, the material of the groove forming portion, and the material of the inserting portion are just examples and may be suitably changed. In a case where high manganese steel is used as the material of the hull supporting member and the material of the inserting portion, the manufacturing cost can be reduced while securing the strength of the tank skirt.

From the foregoing explanation, many modifications and other embodiments of the present invention are obvious to one skilled in the art. Therefore, the foregoing explanation should be interpreted only as an example and is provided for the purpose of teaching the best mode for carrying out the present invention to one skilled in the art. The structures and/or functional details may be substantially modified within the spirit of the present invention.

INDUSTRIAL APPLICABILITY

The present invention is preferably applicable to a case where two members made of dissimilar metals to each other are coupled to each other. The present invention may be especially preferably applicable to a tank skirt of an LNG transport ship. In addition, the present invention may be preferably applicable to dissimilar joint structures in vehicles, such as cars and railroad vehicles, machine parts, and building structural members.

The invention claimed is:

1. A tank skirt fixed to a hull, configured to support a tank, and including a curved portion in plan view, the tank skirt comprising:
 a hull supporting member fixed to the hull;
 a tank supporting member fixed to the tank and made of a metal dissimilar to a metal of the hull supporting member; and
 a dissimilar joint structure configured to join the hull supporting member and the tank supporting member, wherein:
  the dissimilar joint structure is formed by an inserting groove formed at one of the hull supporting member and the tank supporting member and an inserting portion which is able to be inserted into the inserting groove and is formed at the other of the hull supporting member and the tank supporting member, and the inserting groove is constituted by a groove forming portion which is provided at said one of the hull supporting member and the tank supporting member and has a U-shaped cross section, and the inserting groove and the inserting portion extend in a circumferential direction of the tank supporting member; and
  the groove forming portion is joined to the inserting portion by friction stir welding with the inserting portion inserted into the inserting groove.

2. The tank skirt according to claim 1, wherein
 the inserting groove is formed at the tank supporting member; and
 the tank supporting member includes a base member and a groove forming member configured to be made of a metal that is the same as a metal of the base member and form a pair of side wall portions defining the inserting groove.

3. A tank skirt fixed to a hull and configured to support a tank, the tank skirt comprising:
 a hull supporting member fixed to the hull;
 a tank supporting member fixed to the tank and made of a metal dissimilar to a metal of the hull supporting member; and
 a dissimilar joint structure configured to join the hull supporting member and the tank supporting member, wherein:
  the dissimilar joint structure includes (i) an inserting portion formed at an upper end portion of the hull supporting member, (ii) a first groove forming member made of a metal that is the same as a metal of the hull supporting member, covering the inserting portion from an inner side where the tank is provided, and joined to the inserting portion by friction stir welding, and (iii) a second groove forming member made of a metal that is the same as the metal of the hull supporting member, covering the inserting portion from an outer side opposite the inner side from which the first groove forming member covers the inserting portion, and joined to the inserting portion by the friction stir welding; and
  an upper end surface of the first groove forming member and an upper end surface of the second groove forming member contact and are joined to a lower end surface of the hull supporting member.

4. The tank skirt according to claim 3, wherein:
 an upper end surface of the inserting portion is flush with the upper end surface of the first groove forming member and the upper end surface of the second groove forming member; and
 the lower end surface of the hull supporting member contacts the upper end surface of the inserting portion, the upper end surface of the first groove forming portion, and the upper end surface of the second groove forming portion to be joined to the upper end surface of the first groove forming portion and the upper end surface of the second groove forming portion.

5. The tank skirt according to claim 1, wherein a concave groove is formed on a surface of the inserting portion, and a convex portion is formed at the one of the hull supporting member and the tank supporting member that has the inserting groove so as to project into the concave groove.

6. The tank skirt according to claim 1, wherein a boundary portion between the hull supporting member and the tank supporting member is covered with a covering member configured to prevent moisture ingress.

7. A tank skirt structure fixed to a hull and configured to support a tank configured to store a liquefied natural gas, the tank skirt structure comprising:
a hull supporting member fixed to the hull;
a tank supporting member fixed to the tank and made of a metal dissimilar to a metal of the hull supporting member; and
a dissimilar joint structure configured to loin the hull supporting member and the tank supporting member, wherein:
an inserting groove of the dissimilar joint structure is formed at the tank supporting member, and an inserting portion of the dissimilar joint structure is formed at the hull supporting member, the inserting portion being able to be inserted into the inserting groove;
the tank supporting member is joined to the hull supporting member with the inserting portion inserted into the inserting groove;
the tank supporting member includes an inner side wall portion which defines the inserting groove and covers a side surface of the inserting portion which surface is located on a side where the tank is provided and an outer side wall portion which covers a side surface of the inserting portion which surface is located on a side opposite the side where the tank is provided, and the inner side wall portion is thinner than the outer side wall portion; and
a relation "$(d1-d2)/4<d3<(d1-d2)/2$" is true, where $d1$ denotes a thickness of the groove forming member forming the inserting groove, $d2$ denotes a width of the inserting groove, and $d3$ denotes a thickness of the inner side wall portion.

8. The tank skirt according to claim 1, wherein the tank supporting member is made of an aluminum alloy, and the hull supporting member is made of stainless steel or high manganese steel.

9. A method for joining a hull supporting member fixed to a hull and a tank supporting member fixed to a tank mounted on the hull, the hull supporting member and the tank supporting member being made of dissimilar metals to each other and being included in a tank skirt including a curved portion in plan view,
the method comprising the steps of:
inserting an inserting portion into an inserting groove in an upper-lower direction, the inserting portion being formed at one of the hull supporting member and the tank supporting member so as to extend in a circumferential direction of the tank supporting member, the inserting groove being formed at a groove forming portion so as to extend in the circumferential direction of the tank supporting member, the groove forming portion being formed at the other of the hull supporting member and the tank supporting member and having a U-shaped cross section; and
with the inserting portion inserted into the inserting groove, joining the other of the hull supporting member and the tank supporting member to said one of the hull supporting member and the tank supporting member by pressing a rotary tool of a friction stir welding apparatus against an outer surface of the other of the hull supporting member and the tank supporting member, causing the rotary tool to move from the outer surface toward the inserting portion, and causing the rotary tool to move in a direction in which the other of the hull supporting member and the tank supporting member extends.

10. The method according to claim 9, further comprising the step of forming a concave groove on a surface of the inserting portion before the step of inserting the inserting portion, wherein
in the step of joining the other of the hull supporting member and the tank supporting member to said one of the hull supporting member and the tank supporting member, a metal material which is fluidized by friction stiffing and forms the other of the hull supporting member and the tank supporting member gets into the concave groove.

11. The method according to claim 9, further comprising the step of removing an oxide film formed on a surface of the inserting groove and/or an oxide film formed on a surface of the inserting portion before the step of inserting the inserting portion.

12. The method according to claim 9, further comprising the step of decreasing surface roughness of the surface of the inserting groove and/or surface roughness of a surface of the inserting portion before the step of inserting the inserting portion.

13. The method according to claim 9, further comprising the step of forming a rust preventive film on a surface of the inserting groove and/or on a surface of the inserting portion before the step of inserting the inserting portion, wherein
in the step of joining the other of the hull supporting member and the tank supporting member to said one of the hull supporting member and the tank supporting member, the rust preventive film is removed by an action of the rotary tool.

14. A method for joining a hull supporting member fixed to a hull and a tank supporting member fixed to a tank mounted on the hull, the hull supporting member and the tank supporting member being made of dissimilar metals to each other and being included in a tank skirt,
the method comprising the steps of:
covering, with a first groove forming member, one side surface of an inserting portion formed at the hull supporting member;
joining the first groove forming member to the inserting portion by pressing a rotary tool of a friction stir welding apparatus against an outer surface of the first groove forming member, causing the rotary tool to move from the outer surface toward the inserting portion, and causing the rotary tool to move in a direction in which the first groove forming member extends;
covering the other side surface of the inserting portion with a second groove forming member;
joining the second groove forming member to the inserting portion by pressing the rotary tool of the friction stir welding apparatus against an outer surface of the second groove forming member, causing the rotary tool to move from the outer surface toward the inserting portion, and causing the rotary tool to move in a direction in which the second groove forming member extends; and joining a lower end surface of the tank supporting member to an upper end surface of the first groove forming member and an upper end surface of the second groove forming member with the lower end surface of the tank supporting member contacting an upper end surface of the inserting portion.

15. A transport ship comprising: a hull; a tank mounted on the hull; and a tank skirt fixed to the hull, configured to support the tank, and including a curved portion in plan view, wherein:

the tank skirt includes a hull supporting member fixed to the hull, a tank supporting member which is fixed to the tank and is made of a metal dissimilar to a metal of the hull supporting member, and a dissimilar joint structure configured to join the hull supporting member and the tank supporting member;

the dissimilar joint structure is formed by an inserting groove formed at one of the hull supporting member and the tank supporting member and an inserting portion formed at the other of the hull supporting member and the tank supporting member, the inserting portion being able to be inserted into the inserting groove, the inserting groove is formed by a groove forming portion formed at said one of the hull supporting member and the tank supporting member and having a U-shaped cross section, and the inserting groove and the inserting portion extend in a circumferential direction of the tank supporting member; and the groove forming portion is joined to the inserting portion by friction stir welding with the inserting portion inserted into the inserting groove.

* * * * *

UNITED STATES PATENT AND TRADEMARK OFFICE
CERTIFICATE OF CORRECTION

| | |
|---|---|
| PATENT NO. | : 8,113,133 B2 |
| APPLICATION NO. | : 12/810504 |
| DATED | : February 14, 2012 |
| INVENTOR(S) | : Yukichi Takaoka et al. |

It is certified that error appears in the above-identified patent and that said Letters Patent is hereby corrected as shown below:

Column 22:

Lines 19-20, delete "stiffing" and insert --stirring-- therefor.

Signed and Sealed this
Tenth Day of July, 2012

David J. Kappos
*Director of the United States Patent and Trademark Office*